(12) United States Patent
Higuchi et al.

(10) Patent No.: US 8,391,128 B2
(45) Date of Patent: Mar. 5, 2013

(54) MOBILE COMMUNICATION SYSTEM, RECEIVER AND METHOD

(75) Inventors: Kenichi Higuchi, Saitama (JP); Hiroyuki Kawai, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 293 days.

(21) Appl. No.: 12/936,270

(22) PCT Filed: Mar. 3, 2009

(86) PCT No.: PCT/JP2009/053967
§ 371 (c)(1),
(2), (4) Date: Dec. 8, 2010

(87) PCT Pub. No.: WO2009/122842
PCT Pub. Date: Oct. 8, 2009

(65) Prior Publication Data
US 2011/0090893 A1     Apr. 21, 2011

(30) Foreign Application Priority Data

Apr. 4, 2008 (JP) ................. 2008-098633
Dec. 10, 2008 (JP) ................. 2008-315034

(51) Int. Cl.
*H04J 11/00* (2006.01)
*H04W 4/00* (2009.01)
*H04B 7/216* (2006.01)
*H04K 1/10* (2006.01)

(52) U.S. Cl. ......... 370/203; 370/334; 370/342; 375/260

(58) Field of Classification Search ................ 370/203, 370/204, 208, 310.2, 328, 334, 338, 342; 375/260

See application file for complete search history.

(56) References Cited

U.S. PATENT DOCUMENTS

| | | | | |
|---|---|---|---|---|
| 7,933,353 B2* | 4/2011 | Maltsev et al. | .............. | 375/267 |
| 7,970,355 B2* | 6/2011 | Barak et al. | .................. | 455/63.1 |
| 8,000,416 B2* | 8/2011 | Teo et al. | ...................... | 375/341 |
| 8,009,598 B2* | 8/2011 | Chen et al. | ..................... | 370/310 |
| 8,107,563 B2* | 1/2012 | Yoon et al. | ..................... | 375/341 |
| 8,121,220 B1* | 2/2012 | Shi et al. | ....................... | 375/316 |
| 8,199,841 B1* | 6/2012 | Sarrigeorgidis et al. | ....... | 375/267 |
| 8,229,017 B1* | 7/2012 | Lee et al. | ....................... | 375/267 |

(Continued)

FOREIGN PATENT DOCUMENTS

JP    2006-222743 A    8/2006

OTHER PUBLICATIONS

International Search Report w/translation from PCT/JP2009/053967 dated May 19, 2009 (5 pages).

(Continued)

*Primary Examiner* — Warner Wong
(74) *Attorney, Agent, or Firm* — Osha Liang

(57) ABSTRACT

A transmitter in a mobile communication system code-multiplexes transmission symbols together with spreading codes, performs inverse Fourier transform and transmits the result from multiple transmit antennas. A receiver in the mobile communication system performs Fourier transform on signals received at multiple receive antennas, extracts signal components of individual subcarriers and estimates symbols in accordance with a QR decomposition algorithm. A unitary matrix is derived such that a product of a spreading matrix including spreading elements as its elements and a channel matrix representing radio channel states is equal to a product of the unitary matrix and a triangular matrix. A reception vector, a unitary matrix and a triangular matrix are used to estimate symbol candidates transmitted from individual transmit antennas.

11 Claims, 13 Drawing Sheets

U.S. PATENT DOCUMENTS

| | | | | |
|---|---|---|---|---|
| 8,243,842 | B2* | 8/2012 | Oka | 375/267 |
| 8,284,875 | B2* | 10/2012 | Park et al. | 375/341 |
| 2004/0100928 | A1* | 5/2004 | Ben-David et al. | 370/335 |
| 2004/0124301 | A1* | 7/2004 | Ishihara | 242/348 |
| 2004/0136349 | A1* | 7/2004 | Walton et al. | 370/338 |
| 2006/0274708 | A1* | 12/2006 | Estraviz et al. | 370/342 |
| 2008/0056396 | A1* | 3/2008 | Li | 375/260 |
| 2008/0075022 | A1* | 3/2008 | Lei et al. | 370/310 |
| 2008/0095257 | A1* | 4/2008 | Maeda et al. | 375/262 |
| 2008/0181170 | A1* | 7/2008 | Branlund et al. | 370/328 |
| 2009/0154427 | A1* | 6/2009 | Lee et al. | 370/335 |
| 2010/0142633 | A1* | 6/2010 | Yu et al. | 375/260 |

OTHER PUBLICATIONS

Written Opinion from PCT/JP2009/053967 dated May 19, 2009 (3 pages).

Y. Morishige et al.; "A study on comparison between Successive Detection scheme based on ML criterion using M Algorithm and QRD-M algorithm in down-link MC-CDMA System" (cited on ISR as "Down-link MC-CDMA System ni Okeru Yudo Kihan ni Motozuku M Algorithm o Mochiita Chikuji Kentei Hoshiki to ORD-M Algorithm tono Hikaku"); IEICE Technical Report; Oct. 20, 2005; pp. 1-6 (8 pagse).

H. Kawi et al.; "Investigations on BLER and Throughput Performances of Adaptive Selection Algorithm of Surviving Symbol Replica Candidates in QRM-MLD for MIMO Multiplexing Using OFCDM Wireless Access" (cited on ISR as "QRM-MLD o Mochiiru OFCDM MIMO Taju ni Okeru Shinraido Joho o Mochiiru Tekio Ikinokori Symbol Replica Koho Sentakuho no Tokusei Hyoka"); IEICE Technical Report; Jul. 9, 2004; pp. 19-24 (8 pages).

H. Kawai et al.; "Likelihood Function for QRM-MLD Suitable for Soft-Decision Turbo Decoding and Its Performance for OFCDM MIMO Multiplexing in Multipath Fading Channel"; IEICE transactions on communications, vol. E88-B, No. 1; The Institute of Electronics, Information and Communication Engineers; Jan. 1, 2005; pp. 47-57 (11 pages).

H. Kawai et al.; "Independent Adaptive Control of Surviving Symbol Replica Candidates at Each Stage Based on Minimum Branch Metric in QRM-MLD for OFCDM MIMO Multiplexing"; Vehicular Technology Conference; vol. 3; Sep. 26, 2004; pp. 1558-1564 (7 pages).

K.J. Kim, et al.; "Joint Channel Estimation and Data Detection Algorithms for MIMO-OFDM Systems"; Proc. 36th Asilomar Conference on Signals, Systems and Computers; Nov. 2002; pp. 1857-1861 (5 pages).

* cited by examiner

MOBILE COMMUNICATION SYSTEM, RECEIVER AND METHOD

TECHNICAL FIELD

The present invention relates to the technical field of mobile communications and more particularly relates to a mobile communication system, a receiver and a method that utilize a MC-CDMA (Multi Carrier-Code Division Multiple Access) scheme and a MIMO (Multiple Input Multiple Output) scheme.

BACKGROUND ART

Multi carrier transmission schemes are schemes where a frequency band is segmented into multiple smaller bands (subcarriers) and signals are independently transmitted in the subcarriers. Particularly, an OFDMA (Orthogonal Frequency Division Multiple Access) scheme arranges the subcarriers in such a manner that the individual subcarriers are mutually orthogonal, resulting in higher frequency utilization efficiency for faster and higher capacity transmissions. In the OFDMA scheme, inter-subcarrier interference can be effectively suppressed, and accordingly the individual subcarriers can be used to transmit signals in parallel. As a result, the length of one symbol can be enlarged. Also, it is possible to suppress multipath interference effectively by setting a reasonably long guard interval.

In the MC-CDMA scheme, a transmission signal is code-spread over all the subcarriers. As a result, frequency diversity effect can be improved compared to a simple OFDM scheme, and thus the quality of signal transmissions can be further enhanced.

Meanwhile, in the case where the MC-CDMA scheme and the MIMO scheme are utilized together, signals are code-spread over the overall frequency band, and accordingly a reception signal received at one receive antenna corresponds to a sum signal resulting from multiplexing the spread signals over the overall frequency band corresponding to the number of transmit antennas. In the case where the simple OFDM scheme and the MIMO scheme are utilized together, a certain subcarrier signal is extracted from the sum signal, and signal detection can be performed on the extracted signal component to restore transmission signals transmitted from the respective transmit antennas. However, in the case where the MC-CDMA scheme and the MIMO scheme are utilized together, it is not significant to extract the certain subcarrier signal from the sum signal. This is because the signals are spread over the overall frequency band. If the signals can be despread, a certain signal component may be extracted from the sum signal. However, that is hard because reception signals are generally subject to frequency selective fading and accordingly the orthogonality of the spread codes may be impaired. Thus, it is necessary to simultaneously detect the signals which are spread over the overall frequency band and to which various signals are multiplexed.

As one example, it is assumed that the number of transmit antennas is N, the data modulation level is B (for example, B=4 in 16 QAM), the number of conceived multiplexed codes is P and the signal detection is conducted at the receiver side in accordance with MLD (Maximum Likelihood Detection). (See non-patent document 1 for a conventional QRM-MLD method, for example.) As stated above, the OFDM scheme can suppress the inter-subcarrier interference effectively and restrain the multipath interference within the guard interval sufficiently. In this case, the number of symbol candidates that the receiver side must consider is Equal to $2^{N \times B}$. On the other hand, in the MC-CDMA scheme, the number of symbol candidates that may have to be considered for the number of multiplexed codes P is equal to $2^{N \times B \times P}$. Since the number of symbol candidates increases exponentially depending on the number of multiplexed codes, the calculation amount of the signal detection significantly increases. In MIMO transmission in accordance with the MC-CDMA scheme, the signal detection can be conducted with a high accuracy, but it is hard to apply the MLD method due to its large calculation amount. On the other hand, in some signal detection methods requiring a less calculation amount such as a ZF (Zero Forcing) method and a MMSE (Minimum Mean Square Error) method, there is a risk of degrading the accuracy of the signal detection. The poor signal detection accuracy at the receiver side means that signals must be transmitted at larger power to maintain required signal quality (required SINR).

Non-patent document 1: K. J. Kim, et al., "Joint channel estimation and data detection algorithm for MIMO-OFDM systems", Proc. $36^{th}$ Asilomar Conference on Signals, Systems and Computers, November 2002

DISCLOSURE OF INVENTION

Problem to be Solved by the Invention

One object of the present invention is to improve the signal detection accuracy at the receiver side under the case where the MC-CDMA scheme is utilized in a MIMO based mobile communication system.

Means for Solving the Problem

In one aspect of the present invention, there is provided a receiver for use in a mobile communication system using a MC-CDMA scheme and a MIMO transmission scheme. In the mobile communication system, a set of symbols in a sequence of transmission symbols together with spreading codes for code multiplexing is converted into a code-multiplexed signal, and inverse Fourier transform is performed on the converted code-multiplexed signal, and the resulting signal is transmitted from multiple transmit antennas.

The receiver includes an extraction unit configured to perform Fourier transform on signals received at multiple receive antennas and extract signal components of individual subcarriers and a signal detection unit configured to apply a QR decomposition algorithm to the extracted signal components and estimate a transmission symbol.

The signal detection unit includes a decomposition unit configured to find a unitary matrix such that a product of a spreading matrix and a channel matrix is equal to a product of the unitary matrix and a triangular matrix, the spreading matrix having the spreading codes for the code multiplexing as matrix elements, and the channel matrix representing radio channel states between the transmit antennas and the receive antennas and an estimation unit configured to use the triangular matrix and a vector to estimate transmission symbols transmitted from the individual transmit antennas, the vector resulting from multiplication of the unitary matrix with a reception vector including the signal components received at the receive antennas.

The signal detection unit may include a candidate narrowing unit configured to provide metrics for the individual symbol candidates and narrow down the symbol candidates based on the metrics, and the metrics may represent square Euclidean distances between the symbol candidates and reception symbols on a symbol constellation.

The receiver may further include a rearrangement control unit configured to provide the decomposition unit with an indication signal for rearranging rows or columns of a matrix product of the channel matrix and the spreading matrix. The decomposition unit may find the triangular matrix and the unitary matrix in accordance with the indication signal such that the matrix product having the rearranged row or columns is equal to a product of the triangular matrix and the unitary matrix.

The rearrangement control unit may provide the indication signal such that the estimation unit estimates a symbol from a transmit antenna corresponding to greater reception power before a symbol from a transmit antenna corresponding to smaller reception power in symbol estimation in accordance with a M algorithm.

The rearrangement control unit may provide the indication signal such that the estimation unit estimates a subcarrier component of a symbol transmitted from a second transmit antenna in a first subcarrier after estimating a subcarrier component of the first subcarrier of a symbol transmitted from the first transmit antenna.

The number of surviving symbol candidates at each stage may be variably controlled depending on a radio transmission state in narrowing down the symbol candidates by the estimation unit using a M algorithm where a number of stages corresponding to a number of rows or a number of columns of the triangular matrix are utilized.

Cumulative metrics may be calculated for individual combinations of symbol candidates surviving until a certain stage and be stored as cumulative metrics for the certain stage. The estimation unit may determine a combination of symbol candidates surviving at a next stage by comparing a sum of a metric of a symbol candidate added at the next stage and the cumulative metric of a certain combination of symbol candidates with a cumulative metric of another combination of symbol candidates.

The estimation unit may calculate a total sum of the metrics for a certain combination symbols transmitted from individual transmit antennas and exclude a combination of symbols having a total sum larger than the calculated total sum from the surviving candidates.

In one aspect of the present invention, there is provided a mobile communication system including a transmitter and a receiver and using a MC-CDMA scheme ad a MIMO transmission scheme.

The transmitter includes a conversion unit configured to convert a set of symbols in a sequence of transmission symbols together with spreading codes for code multiplexing into a code-multiplexed signal, an inverse Fourier transform unit configured to perform inverse Fourier transform on the code-multiplexed set of symbols and a transmitting unit configured to transmit signals including the inverse Fourier transform applied symbols from multiple transmit antennas.

The receiver includes an extraction unit configured to perform Fourier transform on signals received at multiple receive antennas and extract signal components of individual subcarriers and a signal detection unit configured to apply a QR decomposition algorithm to the extracted signal components and estimate a transmission symbol.

The signal detection unit includes a decomposition unit configured to find a unitary matrix such that a product of a spreading matrix and a channel matrix is equal to a product of the unitary matrix and a triangular matrix, the spreading matrix having the spreading codes for the code multiplexing as matrix elements, and the channel matrix representing radio channel states between the transmit antennas and the receive antennas and an estimation unit configured to use the triangular matrix and a vector to estimate transmission symbols transmitted from the individual transmit antennas, the vector resulting from multiplication of the unitary matrix with a reception vector including the signal components received at the receive antennas.

Advantage of the Invention

According to the present invention, it is possible to improve the signal detection accuracy at the receiver side under the case where the MC-CDMA scheme is utilized in a MIMO based mobile communication system.

| LIST OF REFERENCE SYMBOLS | |
|---|---|
| 50: | cell |
| 100: | user equipment (UE) |
| 200: | base station (eNB) |
| 300: | access gateway |
| 400: | core network |
| 21: | code spreading unit |
| 22: | code multiplexing unit |
| 23: | inverse fast Fourier transform (IFFT) unit |
| 24: | guard interval addition unit |
| 41: | guard interval removal unit |
| 42: | fast Fourier transform (FFT) unit |
| 44: | signal detection unit |
| 62: | channel estimation unit |
| 64: | rearrangement control unit |
| 210: | QR decomposition unit |
| 212: | signal conversion unit |
| 214: | maximum likelihood detection unit |
| 215: | likelihood output unit |
| 216-1-4: | detection unit |

BEST MODE FOR CARRYING OUT THE INVENTION

For convenience, embodiments of the present invention are described using specific numerical values in order to facilitate understandings of the present invention. However, unless specifically stated otherwise, these numerical values are illustrative, and any other value may be used.

Embodiments of the present invention are described in terms of items as set forth below.

| 1. | System |
| 2. | Transmitter |
| 3. | Receiver |
| 4. | Operations |
| 5. | Details of signal detection unit |
| 6. | Variation 1 |
| 7. | Variation 2 |
| 8. | Variation 2-methods 1 and 2 |
| 9. | Variation 3 |
| 10. | Variation 4 |
| 11. | Variation 5 |

Embodiment 1

1. System

Figure 1:
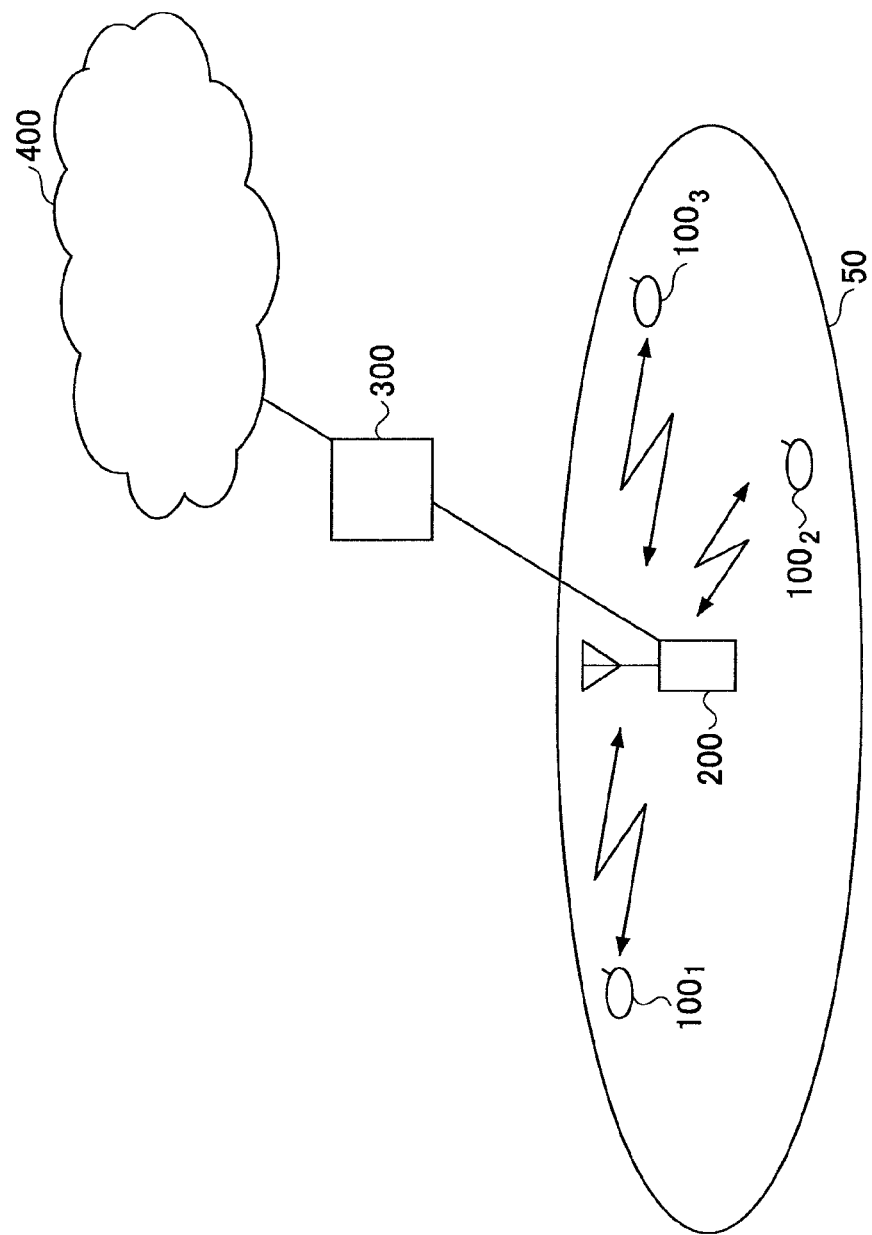
FIG. 1 illustrates a mobile communication system for use in one embodiment of the present invention.

FIG. 1 illustrates a mobile communication system for use in one embodiment of the present invention. In FIG. 1, a cell 50, user equipments $100_1$, $100_2$ and $100_3$ residing within the cell 50, a base station 200, an access gateway and a core network 400 are illustrated. In one embodiment of the present invention, one or more user equipments wirelessly communicates to the base station by using both the MIMO scheme and the MC-CDMA scheme. Typically, the user equipment is a mobile station but may be a fixed station. Although the MIMO scheme and the MC-CDMA scheme are utilized in uplinks and downlinks in this mobile communication system, they may be utilized in only one of the uplinks and downlinks.

2. Transmitter

Figure 2:
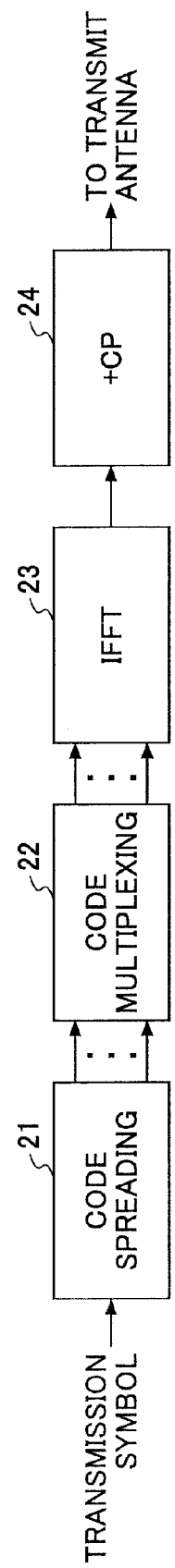
FIG. 2 is a partial functional block diagram illustrating a transmitter.

FIG. 2 illustrates an exemplary transmitter for use in a mobile communication system. In this embodiment, the transmitter is provided in a base station apparatus, but the transmitter may be provided in a base station in other embodiments. In FIG. 2, a code spreading unit 21, a code multiplexing unit 22, an inverse fast Fourier transform (IFFT) unit 23 and a guard interval addition unit (+CP) 24 are illustrated.

The code spreading unit 21 receives a series of symbol sequences to be transmitted, generates a predefined number (e.g., $N_D$) of copies of each symbol. The code spreading unit 21 multiplies the predefined number of symbol copies with spreading codes for code spreading. $N_D$ represents a window size or a block size of discrete Fourier transform (and inverse transform). The symbol sequence is the symbols sequence after error correction encoding and data modulation but may be any other appropriate symbol sequence in general.

The code multiplexing unit 22 adds the different spreading codes applied symbols for individual subcarriers to generate a code-multiplexed symbol sequence.

Figure 3:
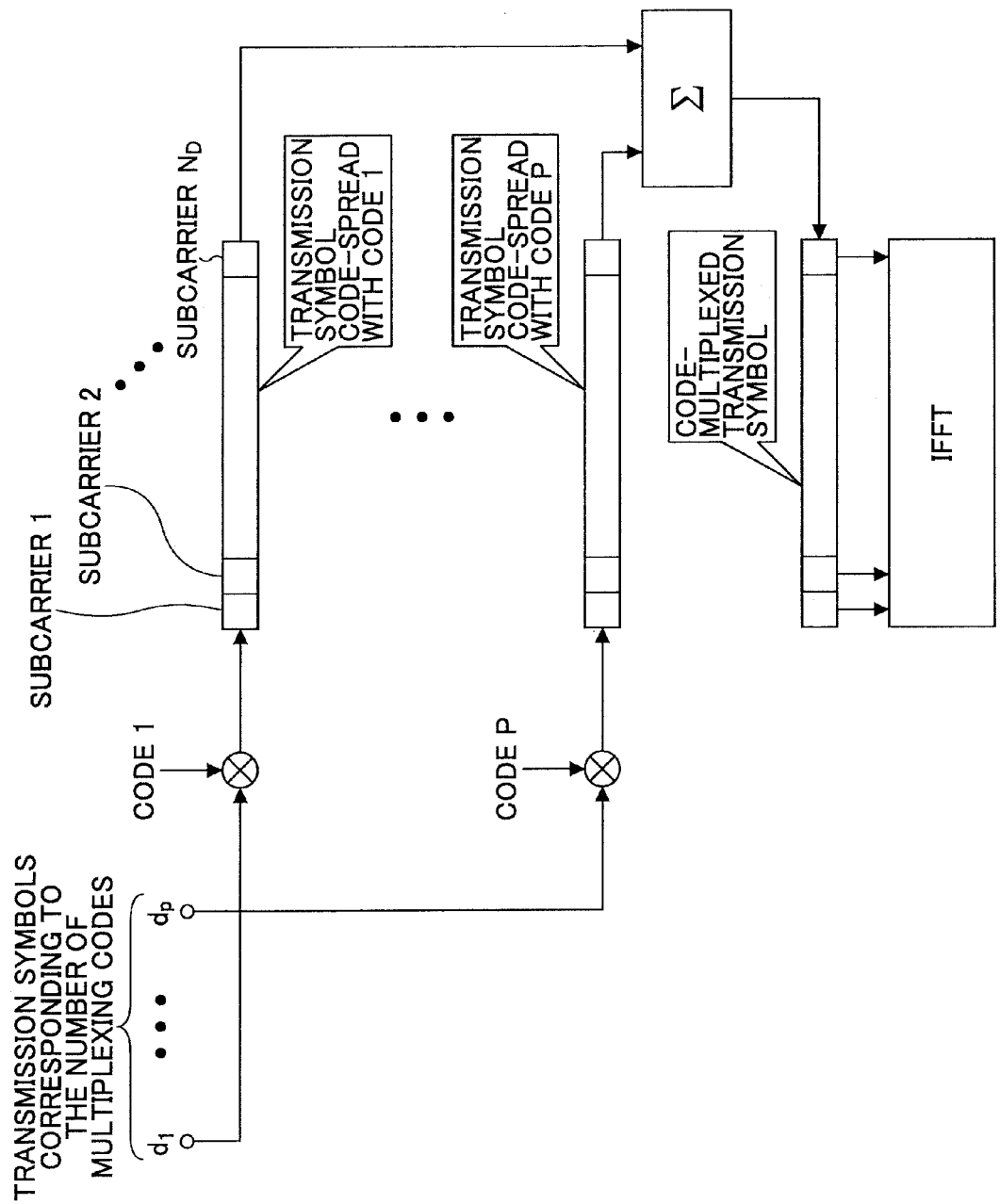
FIG. 3 is a schematic diagram illustrating calculations in a code spreading unit and a code multiplexing unit.

FIG. 3 is a schematic diagram for illustrating operations in the code spreading unit 21 and the code multiplexing unit 22. The illustration is for illustrating the detailed operations, and it is not essential that individual hardware elements and functional elements corresponding to illustrated components are provided. In the illustrated embodiment, P transmission symbols $d_1, \ldots, d_P$ are provided. One spreading code is provided for each of the transmission symbol. A spreading rate (spreading code length) of the spreading code is set to $N_D$ in the illustrated embodiment. In the case where the transmitter illustrated in FIG. 2 is provided in a base station apparatus, each of the P transmission symbols $d_j$ may correspond to data for one user. Alternatively, two or more of the P transmission symbols $d_j$ may correspond to data for one user. In the case where the transmitter illustrated in FIG. 2 is provided in a user equipment, all the P transmission symbols correspond to data for that user equipment. In any of the cases, the code-spread transmission symbols are added ($\Sigma$) and code-multiplexed. The code-multiplexed transmission symbols are supplied to the inverse fast Fourier transform unit 23.

The inverse fast Fourier transform (IFFT) unit 23 performs inverse fast Fourier transform on the symbols associated with individual subcarriers to convert frequency domain signals into time domain signals (transmission symbols).

The guard interval addition (+CP) unit 24 adds a guard interval to the transmission symbols and supplies the resulting transmission symbols to the subsequent transmission signal generation unit (not shown). The guard interval may be generated in accordance with a cyclic prefix (CP) method.

3. Receiver

Figure 4:
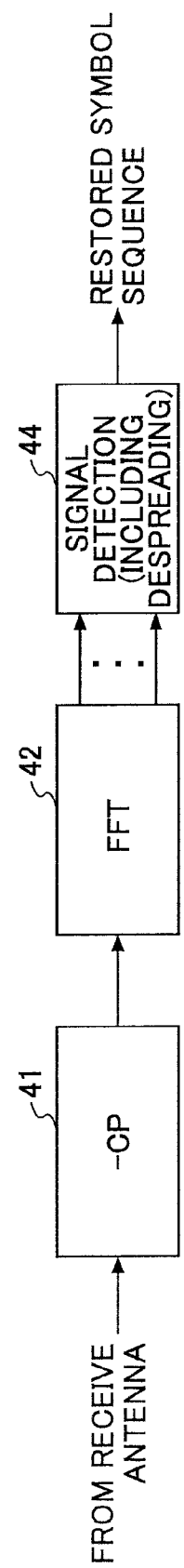
FIG. 4 is a partial functional block diagram illustrating a receiver.

FIG. 4 illustrates an exemplary receiver for use in a mobile communication system. In FIG. 4, a guard interval removal (−CP) unit 41, a fast Fourier transform (FFT) unit 42 and a signal detection unit 44 are illustrated.

The guard interval removal (−CP) unit 41 removes the guard interval from a baseband reception signal.

The fast Fourier transform (FFT) unit 42 performs fast Fourier transform on the reception signal to convert a time domain signal into a frequency domain signal.

The signal detection unit 44 narrows down transmission symbol candidates from signal components of individual subcarriers and finally determines the transmission symbols. As stated below, the signal detection unit 44 can not only segment the reception signal into signals from individual transmit antennas but also perform despreading. This is at least different from conventional MIMO schemes.

4. Operations

Operations are described below. For convenience, a transmission symbol sequence (before code spreading) transmitted from nth transmit antenna in the transmitter in FIG. 2 is written as $x_n$. Thus, $x_n$ would include signals corresponding to the number of multiplexed codes. In addition, the transmission symbol $x_n$ has $N_D$ signal components or subcarrier components. $N_D$ represents a window size (block size) of the discrete Fourier transform and the inverse transform.

$$x_n = [x_{n1} x_{n2} \ldots x_{nND}]^T,$$

where T represents transposition, n is a natural number less than or equal to $N_{TX}$, and $N_{TX}$ is the total number of transmit antennas.

Also, a weight factor $w_i$ applied to i-th subcarrier at the code spreading unit 21 (i is a natural number less than or equal to $N_D$) is represented as follows, $$w_i = [w_{i1} w_{i2} \ldots w_{iND}]^T.$$

All signals simultaneously received at the receiver in FIG. 4 via $N_{RX}$ receive antennas are represented as $$Y = [y_1 y_2 \ldots y_{ND}]^T,$$

where $y_i$ represents signals for i-th subcarrier received at the individual $N_{RX}$ receive antennas.

$$y_i = [u_{i1} y_{i2} \ldots y_{iNRX}]^T.$$

In this case, the reception signal $y_i$ for the i-th subcarrier can be written as $$y_i = \begin{bmatrix} y_{i1} \\ y_{i2} \\ M \\ y_{iN_{RX}} \end{bmatrix}_{N_{TX} \text{ ROW}} = H_i \times \overbrace{\begin{bmatrix} w_i & 0_{ND} & & 0_{ND} \\ 0_{ND} & w_i & & 0_{ND} \\ M & & O & M \\ 0_{ND} & & \Lambda & w_i \end{bmatrix}}^{N_D \times N_{TX} \text{ COLUMN}} \times \begin{bmatrix} x_1 \\ x_2 \\ M \\ x_{NTX} \end{bmatrix} + N_i$$

where $H_i$ is a channel matrix for representing radio channel states for the i-th subcarrier.

$$H_i = \overbrace{\begin{bmatrix} h_{i,11} & h_{i,12} & K & h_{i,1N_{TX}} \\ h_{i,21} & h_{i,22} & K & h_{i,2N_{TX}} \\ M & M & & \\ h_{i,N_{RX}1} & h_{i,N_{RX}2} & K & h_{i,N_{RX}N_{TX}} \end{bmatrix}}^{N_{TX} \text{ COLUMN}}$$

$N_{RX}$ ROW where the channel matrix $H_i$ is a $N_{RX} \times N_{TX}$ matrix, $N_{RX}$ is the total number of receive antennas, and $N_{TX}$ is the total number of transmit antennas. The matrix element $h_{i,pq}$ of the channel matrix represents the i-th subcarrier element in a channel state (transfer function) between the pth receive antenna and the q-th transmit antenna. As one example, the matrix elements of the channel matrix may be derived from reception states of a pilot signal.

$w_i$ is a vector for representing a weight factor in the above spreading code, and $0_{ND}$ is a 0 vector having $N_D$ elements.

$x_n$ represents a signal transmitted from the n-th transmit antenna.

$N_i$ represents a noise component for the i-th subcarrier.

A general representation of all $N_D$ subcarrier elements received at the respective $N_{RX}$ receive antennas can be written as $$\underbrace{\begin{bmatrix} y_1 \\ y_2 \\ M \\ y_{ND} \end{bmatrix}}_{(N_D \times N_{RX}) \text{ ROW}} = \underbrace{\begin{bmatrix} H_1 & 0 & & 0 \\ 0 & H_2 & & 0 \\ M & M & O & M \\ 0 & 0 & & H_{ND} \end{bmatrix}}_{F} \overbrace{\times \begin{bmatrix} w_1 \\ w_2 \\ M \\ w_{ND} \end{bmatrix}}^{N_D \times N_{TX} \text{ COLUMN}} \times \begin{bmatrix} x_1 \\ x_2 \\ M \\ x_{NTX} \end{bmatrix} + \begin{bmatrix} N_1 \\ N_2 \\ M \\ N_D \end{bmatrix} \quad (1)$$

$Y = H \times W \times x + N$

Such signals are supplied to the signal detection unit 44 in FIG. 4.

First, a unitary matrix Q is derived such that the channel matrix H and a weight matrix W can be represented in product form of a certain unitary matrix Q and an upper triangular matrix R.

$$H \times W = Q \times R \quad (2),$$

where the upper triangular matrix R is M×M square matrix (M=$N_D \times N_{TX}$) and consists of matrix elements $r_{ij}$ (i>j) all having zeros.

$$R = \begin{bmatrix} r_{11} & r_{12} & \Lambda & r_{1M} \\ 0 & r_{22} & \Lambda & r_{2M} \\ M & M & O & \\ 0 & 0 & \Lambda & r_{MM} \end{bmatrix} \quad (M = N_D \times N_{TX})$$

In the present specification, a certain matrix A is called a unitary matrix if $A^H A = AA^H = 1$ (identity matrix). Thus, it should be noted that the matrix A is not necessarily a square matrix. Also, the regular character "H" represents a channel matrix, and the suffix "H" represents conjugate transposition.

By multiplying $Q^H$ to the both sides in formula (1) from the left side, the left-hand side can be written as $z = Q^H Y$ and the right-hand side can be written as $$Q^H \times (H \times W \times x + N) = Q^H (Q \times R \times x + N) = R \times x + Q^H N \quad (3).$$

Thus, the unitary converted reception signal z can be represented as R×x, leaving noise out of consideration.

$$z = R \times x \quad (4)$$

Since R is an upper triangular matrix, focusing on the M-th signal component (M=$N_D \times N_{TX}$), $$z_M = r_{MM} \times x_M \quad (5).$$

This means that the M-th signal component $x_M$ can be easily estimate without consideration of signal interference from other subcarriers and/or signals from other transmit antennas.

At the first stage of the transmission symbol estimation, transmission symbol candidates are narrowed down for $x_M$ based on formula (5). $x_M$ must correspond to any signal point on a symbol constellation. For example, there are four possibilities (or candidates) in QPSK, and there are 64 possibilities in 64QAM. For all the possible candidates, the square Euclidean distance between the unitary converted reception signal $z_M$ and $r_{MM} \times (x_M$ candidate=$s_M(x)$) is calculated for use as a surviving metric.

$$e1(x) = |z_M - r_{MM} \times s_M(x)|^2 \quad (6)$$

Among the surviving metrics, S1 (S1□C) candidates are preserved in ascending order, and the other candidates are discarded. C is equal to the total number of signal points (possible candidates) in the symbol constellation.

At the second stage of the transmission symbol estimation, the following formula based on formula (4) is used.

$$z_{M-1} = r_{M-1M-1} \times x_{M-1} + r_{M-1M} \times x_M \quad (7)$$

the S1 candidates derived at the first stage are used for $x_M$. For $x_{M-1}$, there are C different candidates. Accordingly, the surviving metrics are calculated for all possible (S1×C) combinations of $x_M$ and $x_{M-1}$ in the above manner.

$$e2(s_M(x), s_{M-1}(x)) = |z_{M-1} - (r_{N-1M-1} \times s_{M-1}(x) + r_{M-1M} \times s_M(x))|^2 + e1(x) \quad (8)$$

The second term in the right-hand side is the surviving metric derived at the first stage. S2 (S2□S1C) candidates are preserved in ascending order of the surviving metric $e2(s_M(x), s_{M-1}(x))$, and the other candidates are discarded.

Subsequently, the same operation is repeated. The surviving metrics are increasingly accumulated for different stages, and a combination of transmission symbols leading the minimum metric at the last stage is estimated as actually transmitted ones.

In the above description, formula (1) is calculated by using the QR decomposition and the M algorithm, but the QR decomposition and others are not essential to solve formula (1). For example, the numeral calculation may be conducted based on a MMSE (Minimum Mean Square Error) method. Note that the QR decomposition and others are preferably utilized for operation efficiency.

5. Details of Signal Detection Unit

Figure 5:
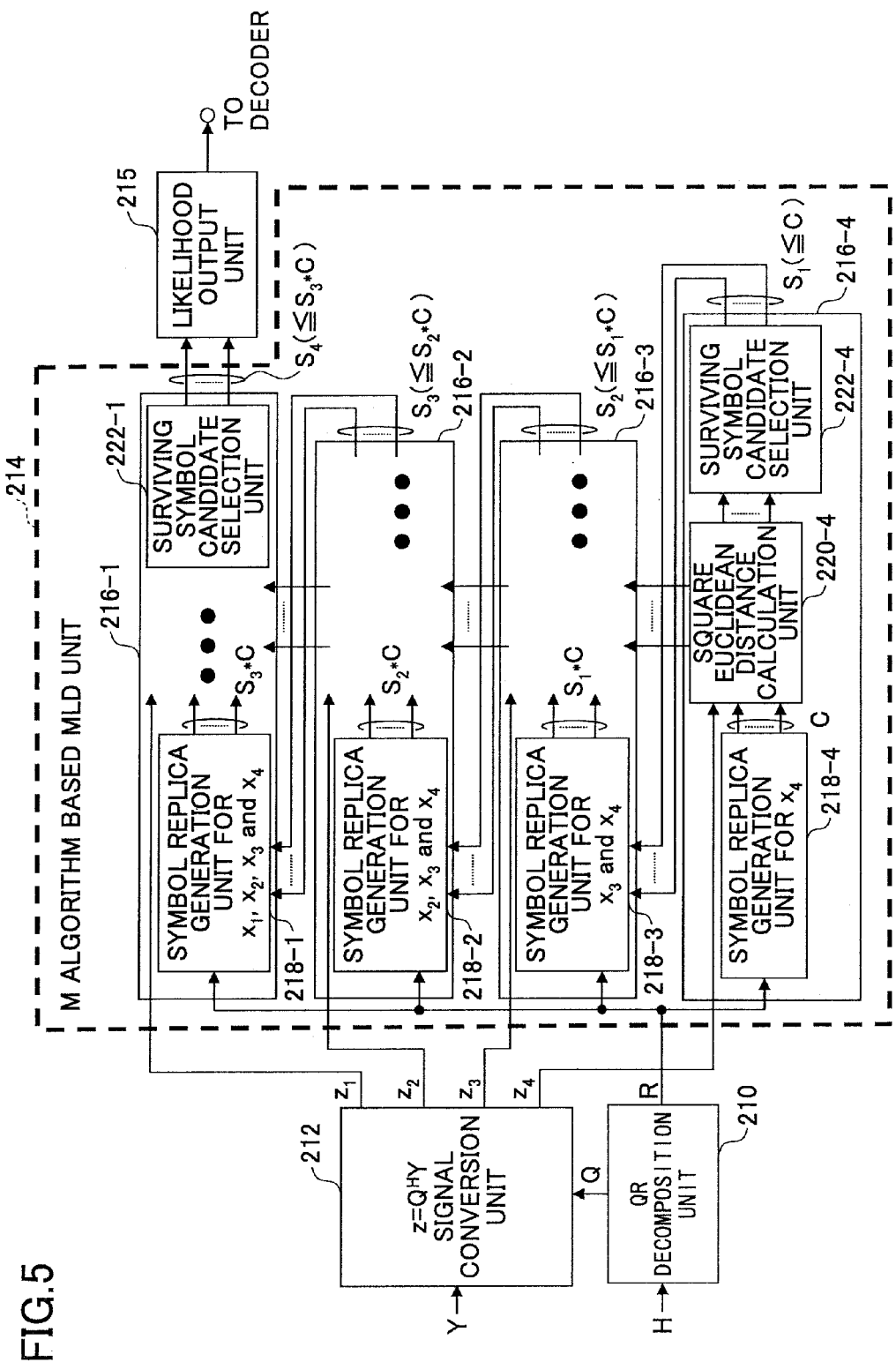
FIG. 5 illustrates one example of a signal detection unit.

FIG. 5 illustrates the signal detection unit in FIG. 4 in details. The signal detection unit mainly acts to execute the above-mentioned operation. The signal detection unit includes a QR decomposition unit 210, a signal conversion unit 212, a maximum likelihood detection unit 214 and a likelihood output unit 215. The maximum likelihood detection unit 214 includes four detection units 216-1, 216-2, 216-3 and 216-4. For clarity, the four detection units are illustrated, but any number of detection units may be provided corresponding to the number of transmission signals. Each of the detection units has the same operation block, and thus the fourth detection unit 216-4 is described on behalf of the detection units 216-1 through 216-4. The detection unit includes a symbol replica generation unit 218-4, a square Euclidean distance calculation unit 220-4 and a surviving symbol candidate selection unit 222-4.

As apparently appreciated to those skilled in the art, processing elements in FIG. 5 and other blocks may be implemented in hardware, software or combinations thereof.

The QR decomposition unit 210 finds matrices Q and R such that the product of the channel matrix H and the weight matrix W can be represented in product form of the unitary matrix Q and the upper triangular matrix R (HW=QR).

The signal conversion unit 212 performs signal conversion by multiplying the conjugate transposition matrix $Q^H$ with a vector Y having several reception signals as its components. If noise is ignored, the unitary converted reception signals can be represented in product form of the upper triangular matrix R and transmission symbols x.

$$z = Rx$$

The maximum likelihood detection unit 214 narrows down symbol candidates of the transmission signals in accordance with the maximum likelihood detection (MLD) method. The symbol replica generation unit 218-4 in the detection unit 216-4 uses matrix elements in the upper triangular matrix R to generate the symbol candidates of the transmission signals corresponding to the reception signals $x_4$. The number of symbol candidates may be set to C, for example.

The square Euclidean distance calculation unit 220-4 calculates the square Euclidean distance between the unitary converted reception signals $z_i$ and the C symbol candidates. The square Euclidean distance represents the surviving metric serving as a basis of the likelihood calculation.

The surviving symbol candidate selection unit 222-4 outputs $S_1$ (□C) symbol candidates as the surviving symbol candidates based on the square Euclidean distance for the different candidates.

The likelihood output unit 215 calculates the likelihood or probability of the symbol candidates supplied from the surviving symbol candidate selection unit at the last stage. More specifically, the likelihood is represented in a log likelihood ratio (LLR). Outputs of the likelihood output unit 215 represents signal separation results, which are transmitted to the subsequent demodulation unit (e.g., turbo decoder).

6. Variation 1

In the above embodiment, the QR decomposition is applied to F=H×W. However, the present invention is not limited to it. For example, the QR decomposition may be applied to a matrix G set forth below.

$$G = \begin{bmatrix} F \\ \sqrt{N_0}\, I \end{bmatrix}$$

where $N_0$ is an average noise power level measured at the receiver. I is an $N_{TX} \times N_{TX}$ identity matrix. In this case, the unitary matrix Q has $N_D(N_{TX}+N_{RX})$ rows and $(N_D \times N_{TX})$ columns. The triangular matrix is a square matrix with $(N_D \times N_{TX})$ rows and $(N_D \times N_{TX})$ columns and the same dimension as the above embodiment. Although the reception signals Y is a vector with $(N_D \times N_{RX})$ rows and one column in the above-mentioned embodiment, it is a vector with $(N_D \times (N_{TX}+N_{RX}))$ rows and one column in this embodiment. Note that $(N_D \times N_{TX})$ elements are zeros.

$$Y' = \begin{bmatrix} y_1 \\ y_2 \\ M \\ y_{ND} \\ 0 \\ M \\ 0 \end{bmatrix} \begin{matrix} \} N_D \times N_{RX} \\ \\ \} N_D \times N_{TX} \end{matrix}$$

It is preferable to use the modified reception signal vector Y' and the matrix G for MMSE type QR decomposition and ZF type QR decomposition.

Also, the upper triangular matrix is utilized in the QR decomposition in the above embodiment, a lower triangular matrix can be equivalently utilized.

7. Variation 2

As stated in conjunction with the above operations, if symbols are transmitted from $N_{TX}$ transmit antennas in $N_d$ subcarriers, the reception signals Y can be written without noise as $$Y = H \times W \times x = F \times x \quad (9),$$

where H is the channel matrix, W is a spreading matrix (having spreading codes as its matrix elements) for representing weights in code spreading in the frequency direction, F is a matrix product of the channel matrix H and the spreading matrix W, and x represents transmission symbols. In the above-mentioned operation, the QR decomposition is applied to the matrix product F. Then, the transmission symbols are sequentially estimated in accordance with the M algorithm. The total number of stages in the M algorithm is equal to $N_{TX} \times N_D$. The unitary matrix $Q^H$ is multiplied with the reception signals Y, and the estimation is made from the lowest symbol sequentially.

$$Q_H Y = Q_H \times (H \times W \times x) = Q^H \times (Q \times R \times x) = R \times x \quad (10),$$

where R is an upper triangular matrix with $(N_D \times N_{TX})$ rows and $(N_D \times N_{TX})$ columns.

Meanwhile, the product of a certain matrix A and a column vector s is equal to the product of a matrix A' resulting from column transposition for the matrix A and a vector s' resulting from the corresponding component transposition of the column vector s.

$$A \times s = A' \times s'$$

For example, assuming that the matrix A consists of two rows and two columns and the column vector is a column vector $s=(s1\ S2)^T$ with two rows and one column, the following formula holds.

$$As = \begin{bmatrix} a & b \\ c & d \end{bmatrix} \begin{bmatrix} s_1 \\ s_2 \end{bmatrix} = \begin{bmatrix} as_1 + bs_2 \\ cs_1 + ds_2 \end{bmatrix} = \begin{bmatrix} bs_2 + as_1 \\ ds_2 + cs_1 \end{bmatrix} = \begin{bmatrix} b & a \\ d & c \end{bmatrix} \begin{bmatrix} s_2 \\ s_1 \end{bmatrix} = A's'$$

In cases of higher order matrices, this relationship holds. The columns in the matrix may be rearranged in any manner. This is because the column vector elements have to be rearranged accordingly. In variation 2 of the present invention, the QR decomposition is performed by utilizing this property.

$$Y = H \times W \times x = F \times x = F' \times x' \quad (9),$$

where the matrix F' results from some transposition of columns in the matrix F (=H×W). The column vector x' is a column vector resulting from rearrangement of elements in the column vector x corresponding to the transposition method.

In the case of the M algorithm, symbol replica candidates are sequentially narrowed down in ascending order of symbols in the transmission symbol vector for each stage. Accordingly, the order of the symbol estimation has a significant impact on the selection accuracy of the surviving symbol replica candidates. In variation 2, columns in the matrix F are rearranged to improve the selection accuracy of the surviving symbol replica candidates and thus symbol estimation accuracy.

Note that rows and columns in a matrix is a relative concept. Thus, if the transmission symbols are defined as a column vector unlike the descriptions of the present embodiment, the rows in the matrix F are rearranged. Even if the transmission symbols are defined as a row vector like the present embodiment, the generality of the present invention would not be lost.

Figure 6:
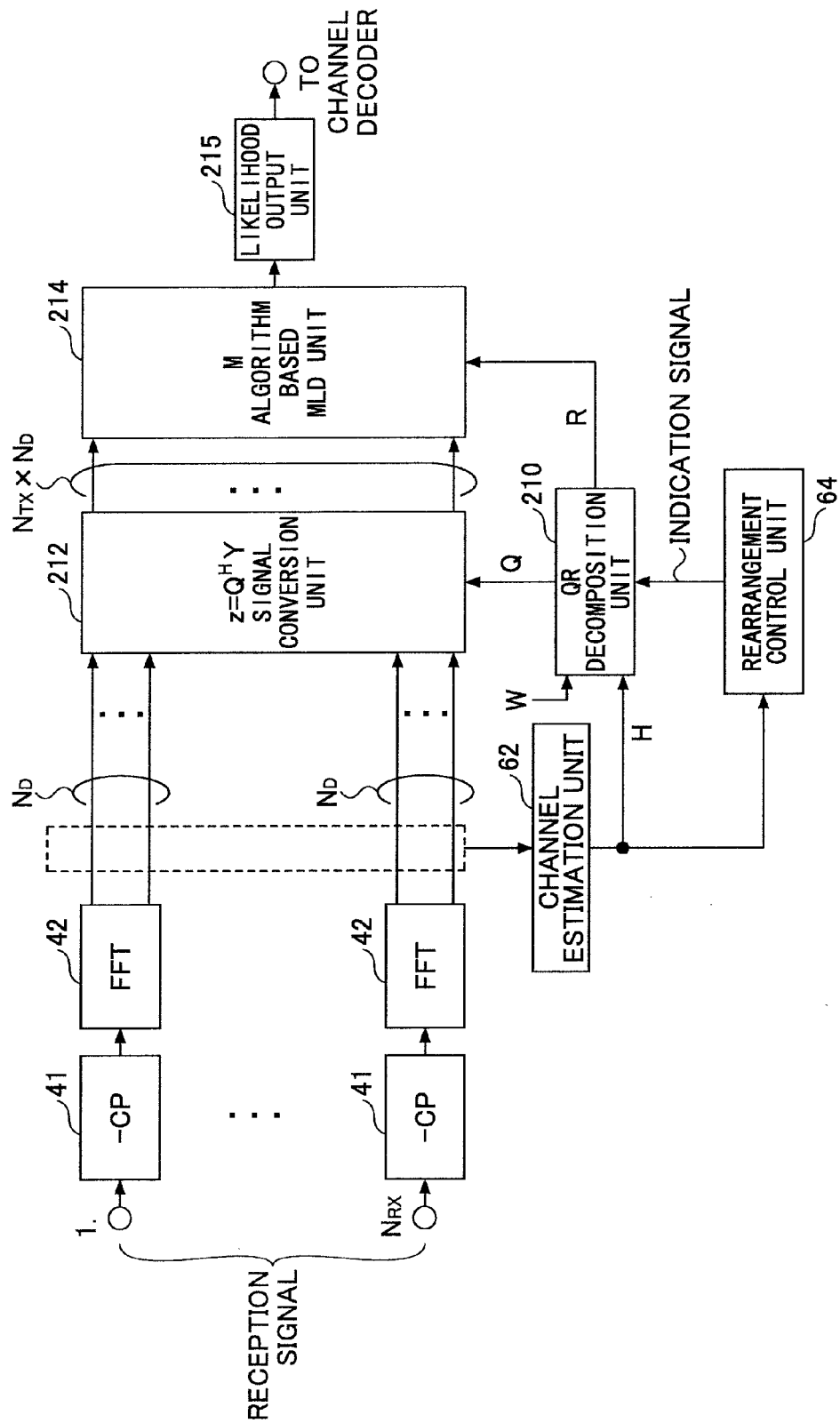
FIG. 6 is a functional block diagram illustrating a receiver in detail.

FIG. 6 illustrates the receiver in FIG. 4 in details. In FIG. 6, a guard interval removal (–CP) unit 41, a fast Fourier transform (FFT) unit 42, a QR decomposition unit 210, a signal conversion unit 212, a MLD unit 214, a likelihood output unit 215, a channel estimation unit 62 and a rearrangement control unit 64 are illustrated.

The guard interval removal (–CP) unit 41 removes the guard interval from base band reception signals.

The fast Fourier transform (FFT) unit 42 performs fast Fourier transform on the reception signals to convert time domain signals into frequency domain signals.

The channel estimation unit 62 estimates radio channel states for individual subcarriers to derive the channel matrix H. As stated above, the channel matrices are derived for the different subcarriers. Thus, the overall channel matrix H would have $(N_{RX} \times N_D)$ rows and $(N_{TX} \times N_{ND})$ columns. As one example, matrix elements of the channel matrix may be derived from reception states of pilot signals.

The QR decomposition unit 210 derives the unitary matrix Q and the upper triangular matrix R based on the channel matrix H, the weight matrix W and indication signals from the rearrangement control unit 64. More specifically, the matrix F' is derived by rearranging columns in the matrix product F of the channel matrix H and the weight matrix W in accordance with the indication signals. The matrices Q and R are found such that the matrix F' can be represented in the product form of the unitary matrix Q and the upper triangular matrix R (F'=QR).

The signal conversion unit 212 performs signal conversion by multiplying the conjugate transposition matrix $Q^H$ of the unitary matrix Q with the vector Y having several reception signals as its elements. The unitary converted reception signals can be represented in the product form of the upper triangular matrix R and the transmission symbols x, ignoring noise, $$z = Q^H Y = Rx.$$

The MLD unit 214 narrows down symbol candidates of transmission signals in accordance with the MLD method. The MLD unit 214 calculates branch metrics for the reception signals $Q^H Y$ (=Rx) resulting from the multiplication of the unitary matrix $Q^H$ from lower symbols sequentially. The branch metric is calculated as the square Euclidean distance between the reception signals and the symbol candidates. A predefined number (M) of symbol candidates are selected as the surviving candidates in the ascending order of cumulative branch metrics, and the operation transitions to the next stage. For each of $N_{TX} \times N_D$ stages, the branch metric calculation and the surviving candidate selection are conducted.

The likelihood output unit 215 calculates the likelihood of the symbol candidates supplied from the surviving symbol candidate selection unit at the last stage. More specifically, the likelihood is represented as a log likelihood ratio (LLR). Outputs from the likelihood output unit 215 represent signal separation results and are supplied to the next stage decoding unit.

The rearrangement control unit 64 supplies indication signals to the QR decomposition unit 210. The indication signal indicates how to rearrange columns of the matrix product F of the channel matrix H and the weight matrix W. The above-mentioned formula (9) holds without depending on the specific rearrangement. The rearrangement is not uniquely determined. The rearrangement is properly determined based on any viewpoint. In this variation, the column rearrangement in the product matrix F may be determined based on reception power of transmission symbols (reception power level at the receiver) (method 1) and/or for each code spreading (subcarrier) (method 2).

8. Variation 2—Method 1

The above method 1 (order control method on a per-transmit antenna basis) is described. According to the present method, the column rearrangement in the product matrix F is determined depending on the strength of reception of the transmission symbols at the receiver. In the sequential symbol estimation in accordance with the M algorithm, symbols estimated at the first through (k−1)-th stages and the k-th row in the triangular matrix R are used at the k-th stage ($1 \leq k \leq N_{TX}N_{SF}$). This means that square sum (signal power) of elements between the ($N_{TX}N_{SF}$−k+1)-th row and the ($N_{TX}N_{SF}$)-th row in the ($N_{TX}N_{SF}$−k+1)-th column in the matrix R is used to narrow down surviving symbol replica candidates for up to k-th ordered transmission symbols. Accordingly, the estimation can be easily conducted at earlier stages (particularly the first stage) while there is a higher probability of false selection of the symbol replica candidates. According to the present method, reception signal power is measured for transmission symbols from individual transmit antennas, and the transmission symbols with greater reception signal power are estimated in higher priority. This is because high reception power decreases the false selection of symbol replica candidates. In order to achieve such priority, the order of columns in the product matrix F and elements in the transmission symbol x is controlled.

In OFDM MIMO multiplexing transmission to which the frequency domain spreading and code multiplexing according to the present method are applied, a number of transmission symbols corresponding to the number of transmit antennas are transmitted after code multiplexing. Each component of the transmission symbols transmitted from the individual transmit antennas has the same reception signal power. Thus, according to the present method, the transmit antennas providing greater reception power are identified, and symbols transmitted from the identified transmit antennas are estimated in priority over (earlier than) symbols transmitted from the other transmit antennas. Any other appropriate existing method for measuring the reception power level for the symbols from the transmit antennas may be utilized. For example, matrix elements of the channel matrix may be utilized. As stated above, the channel matrix $H_i$ for the i-th subcarrier consists of $N_{RX}$ rows and $N_{TX}$ columns where $N_{RX}$ is the total number of receive antennas and $N_{TX}$ is the total number of transmit antennas. A matrix element $h_{i,pq}$ of the channel matrix represents the channel state of the ith subcarrier component in the channel state (transmission functions) between the p-th receive antenna and the q-th transmit antenna. Accordingly, the sum of $|h_{i,pq}|^2$ over all the receive antenna (p=1 to $N_{RX}$) can be utilized to estimate the reception power for symbols from the q-th transmit antenna. For example, it is assumed that $N_{TX}=N_{RX}=2$ and $N_D=3$. In this case, the following formula holds for the i-th subcarrier (i=1, 2, 3), and $$r_{i1}=h_{i,11}x_1+h_{i,21}x_2; \text{ and}$$

$$r_{i2}=h_{i,21}x_1+h_{i,22}x_2.$$

The reception power of symbols from the first transmit antenna can be evaluated in accordance with $$P_{Tx1}=|h_{i,11}|^2+|h_{i,21}|^2.$$

Similarly, the reception power of symbols from the second transmit antenna can be evaluated in accordance with $$P_{Tx2}=|h_{i,12}|^2+|h_{i,22}|^2.$$

It is assumed that the reception power of symbols from the first transmit antenna is greater than the reception power of symbols from the second transmit antenna ($P_{Tx1}>P_{Tx2}$). In the present method, the symbol $x_1=(x_{11}\ x_{12}\ x_{13})^T$ from the first transmit antenna has to be estimated in priority over the symbol $x_2=(x_{21}\ x_{22}\ x_{23})^T$ from the second transmit antenna. In order to implement it, columns in the product matrix F' and elements in the transmission symbol x are rearranged. Specifically, the rearranged transmission symbol x' can be written as $$x'=(x_{21}x_{22}x_{23}x_{11}x_{12}x_{13})^T.$$

From the viewpoint of providing the priority to the symbol from the first transmit antenna, the rearrangement is made to put the elements of the symbol $x_1$ into lower positions. Furthermore, the estimation order of the subcarrier elements $x_{11}$, $x_{12}$ and $x_{13}$ in the symbol $x_1$ is not uniquely determined at this stage. As one example, the estimation may be made in ascending order of the subcarrier numbers. In this case, the rearranged transmission symbol x' can be written as follows, $$x'(x_{21}x_{22}x_{23}x_{11}x_{12}x_{13})^T.$$

Instead of the ascending order, any other order may be applied.

The number of antennas and the number of subcarriers as stated above are simply illustrative, and more antennas and subcarriers may be applied.

8. Variation 2—Method 2

The above method 2 (order control method on a per-spreading code basis) is described. In the case where the surviving symbol replica candidates are selected in accordance with the M algorithm, there is a tendency that combinations of symbols having greater fading correlations may cause larger errors. The higher fading correlation means that symbols are subject to similar fading. In contrast, the lower fading correlation means that symbols are subject to different fading. Although not essential, the fading correlation ranges between 0 and 1, and the fading correlation closer to 1 is higher and the fading correlation closer to 0 is lower.

Figure 7:
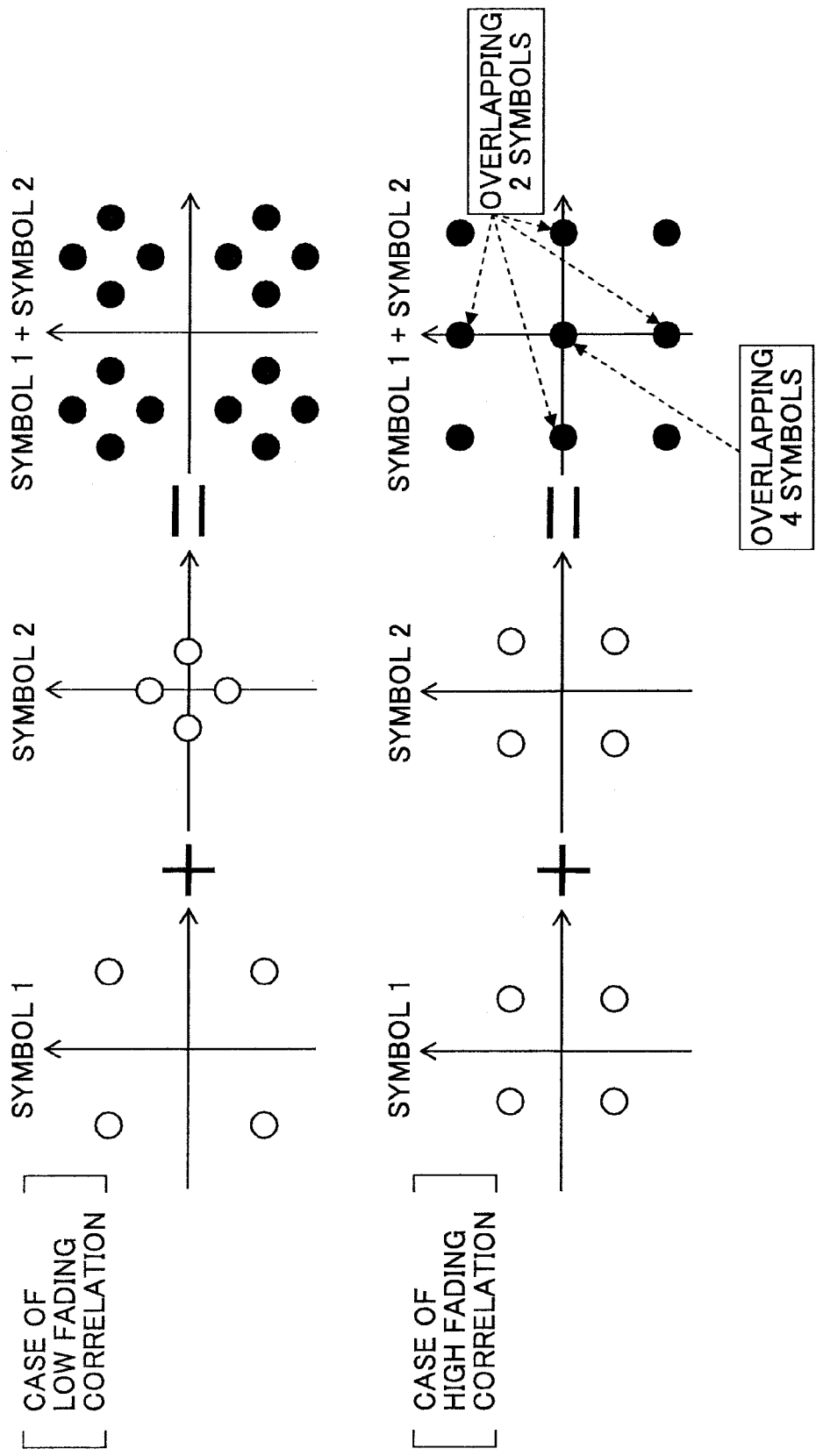
FIG. 7 illustrates different levels of difficulty of determining symbol combinations depending on the magnitude of fading correlation.

FIG. 7 illustrates different degrees of difficulty of the symbol combination determination depending on the magnitude of the fading correlation. For convenience, it is assumed that both the number $N_{TX}$ of transmit antennas and the number $N_{RX}$ of receive antennas are equal to 2. Also, symbol 1 ($x_1$) is transmitted from the first transmit antenna, and symbol 2 ($x_2$) is transmitted from the second transmit antenna. It is assumed that the symbols transmitted from the transmit antennas are data modulated in accordance with the QPSK scheme. In this case, the symbols correspond to any of predefined four signal points on a constellation. There are four possibilities for each of symbols 1 and 2, and accordingly the total number of combinations would be 16. Symbols 1 and 2 are received at the receiver in the manner where they are combined ($r_{i1}$, $r_{i2}$). As stated above, transmission signals and reception signals satisfy formulae as follows, $$r_{i1}=h_{i,11}x_1+h_{i,12}x_2; \text{ and}$$

$$r_{i2}=h_{i,21}x_i+h_{i,22}x_2.$$

In the case where the fading correlation is low, each symbol is subject to significantly different fading. As illustrated in the upper-right in FIG. 7, all 16 symbol combinations can be differentiated for the combined reception signal. As a result, the symbol combination selection can be achieved with high accuracy. On the other hand, in the case where the fading correlation is high, each symbol is subject to similar fading. In the illustration, an extreme example where symbols 1 and 2 are subject to the same fading correlation is presumed. As illustrated in the lower-right in FIG. 7, the 16 symbol combinations can be partially differentiated for the combined reception signal. Only nine symbol combinations can be differentiated due to symbol overlapping. In the illustration, for signal points as illustrated in "overlapping 2 symbols" and "overlapping 4 symbols", it is impossible to determine which of the overlapping symbols is probable based on comparison of the square Euclidean distance and phase.

In the OFDM-MIMO multiplexing transmission to which the frequency domain spreading and the code multiplexing are applied, it is likely that code-multiplexed symbols transmitted from the same antenna may be susceptible to similar fading. (The fading correlation is likely to be high.)

In this variation, taking into account such circumstance, the rearrangement is made such that symbols subject to similar fading are not successively estimated. The symbol detection order is controlled such that after estimating a certain symbol, a symbol subject to fading different from the certain symbol is estimated. More specifically, the order is controlled such that after estimating a transmission symbol transmitted from a certain transmit antenna, a transmission symbol transmitted from a different transmit antenna is estimated.

The similarity determination of the fading correlation may be made in any appropriate manner. As one example, the fading correlation similarity may be determined based on similarity of the amplitude and phase of a matrix element $h_{i,pq}$ in the channel matrix. For example, it is assumed that for the i-th subcarrier, pilot signals with the magnitude of 1 are transmitted from the a-th and b-th transmit antennas and are received at the pth receive antenna. In this case, the correlation between the two reception signals may be evaluated as $h_{i,pa}^* h_{i,pb}$ (the notation "*" represent a complex conjugate). The fading correlation similarity determination method is not limited to it, and any other method may be utilized.

The symbol detection order changed based on the fading correlation may be changed to the order where symbols from all transmit antennas are estimated for each subcarrier element. As stated above, since signals transmitted from the same antenna are subject to similar fading, they are likely to have similar fading correlation. On the other hand, since signals transmitted from different antennas are subject to different fading, they are likely to have different fading correlation. Thus, for example, the i-th subcarrier element is focused on, and $N_{TX}$ transmission symbols transmitted in that subcarrier are estimated. After that, for example, (i+1)-th subcarrier element is focused on, and $N_{TX}$ transmission symbols transmitted in that subcarrier are estimated. Subsequently, the same operation is performed. In this manner, symbols that tend to have different fading correlation can be sequentially estimated. In this embodiment, one subcarrier corresponds to one unit (one chip) in code spreading. Thus, the present method may be called an order control method on a per-spreading code basis. In this method, as one example, the symbol subcarrier elements are estimated in ascending order, and symbols corresponding to all the transmit antennas are estimated in each of the subcarrier elements.

For example, similar to the above example, it is assumed that $N_{TX}=N_{RX}=2$ and $N_D=3$. In this case, the rearranged transmission symbol x' can be written as follows, $$x'=(x_{23}x_{13}x_{22}x_{12}x_{21}x_{11})^T.$$

In this example, the subcarrier element estimation order is the ascending order. However, this is not essential. Any other order may be applied. For example, reception power levels of different subcarrier elements are compared, and the descending order of the reception power may be utilized together. For example, it is assumed that the reception power levels of the second, the third and the first subcarrier elements increase in that order. As stated in method 1 in variation 2, it is desirable that the rearrangement be made in the descending order of the reception power for improved estimation accuracy. Thus, in this case, the desirably rearranged transmission symbol x' can be written as follows, $$x'=(x_{21}x_{11}x_{22}x_{13}x_{22}x_{12})^T.$$

The number of antennas and the number of subcarriers are simply illustrative, and more antennas and subcarriers may be utilized.

9. Variation 3

As described with reference to FIGS. 4 and 5, the symbol candidate combinations are narrowed down into a predefined number of combinations for each stage in accordance with the M algorithm. In the above example, the symbol candidate combinations are narrowed down into C combinations at the first stage, into $S_2$ ($\leq S_1 C$) combinations at the second stage, into $S_3$ ($\leq S_2 C$), and so on. C is equal to the number of signal points in a symbol constellation and corresponds to the total number of possible candidates (in 64QAM, C=64). $S_1$ corresponds to the number of surviving candidates at the first stage and is equal to 16 in the above example. The number of surviving candidates may be kept constant over all the stages or may be variably controlled. In variation 3, the number of surviving candidates is variably controlled depending on the quality of radio transmission channels.

More specific consideration is provided. Assuming Gaussian noise, the probability (likelihood function) that symbol s is transmitted from a transmitter and z is received at a receiver can be written as follows.

$$P(z|s)=\exp[-\|z-x(s)\|^2/(2N_0)]/\sqrt{(2\pi N_0)}=\exp[-Es/(2N_0)]$$

In this case, $N_0=\sigma^2$ represents Gaussian noise power. Es represents the square Euclidean distance and is defined as $Es=\|z-x(s)\|^2$. Thus, the above formula means that the symbol candidate probability (likelihood) of the square Euclidean distance Es can be represented as $\exp[-Es/(2N_0)]$. Accordingly, the symbol candidate probability that the cumulative metric is less than or equal to $(E_{m,min}+XN_0)$ at the m-th stage would be $$\exp[-(E_{m,min}+XN_0)/(2N_0)]/\sqrt{(2\pi N_0)} =$$
$$\exp[-E_{m,min}/(2N_0)]\exp[-(XN_0)/(2N_0)]/\sqrt{(2\pi N_0)} = P_{m,max}\exp[-X/2],$$

where $E_{m,min}$ represents a minimum value of the square Euclidean distance (distance between a reception signal point and a symbol candidate point) at the m-th stage, and $P_{m,max}=\exp[-E_{m,min}/(2N_0)]/\sqrt{(2\pi N_0)}$. In this manner, the number of surviving candidates can be adjusted such that symbol candidates whose cumulative metric is less than $E_{m,min}+XN_0$ can survive. As appreciated from the above formula, the probability variable X>0 is greater, the probability (likelihood function) is higher, and X>0 is smaller, the probability (likelihood function) is lower. By determining the X value appropriately, the number of surviving candidates can be appropriately controlled depending on the radio channel state. For example, for a better radio channel state, that is, for a smaller $N_0$, a smaller number of surviving candidates have to be selected at each stage. In the present variation 3, the value of $E_{m,min}+XN_0$ is small, and accordingly a minimum number of candidates have to be selected. On the other hand, for a poorer radio channel state, that is, for a larger $N_0$, a larger number of surviving candidates have to be selected at each stage. In the present variation 3, the value of $E_{m,min}+XN_0$ is large, and accordingly a larger number of candidates have to be selected.

Figure 8:
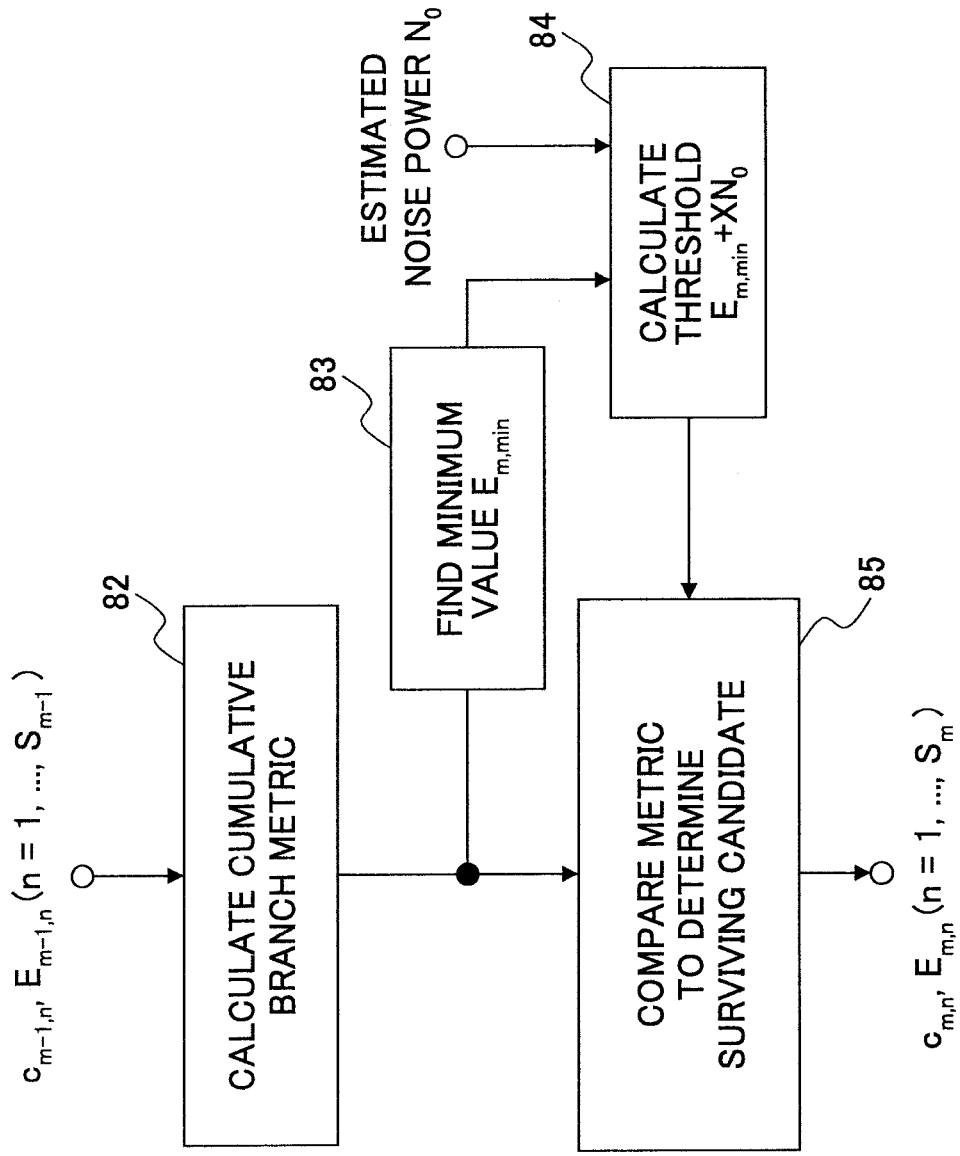
FIG. 8 is a flowchart illustrating an operation of variation 3.

FIG. 8 is a flowchart illustrating an operation of variation 3. This flowchart illustrates that the cumulative metric $E_{m,n}$ and the number $C_{m,n}$ of symbol candidates at the m-th stage are derived from the cumulative metric $E_{m-1,n}$ and the number $C_{m-1,n}$ of symbol candidates at the (m−1)-th stage. At step S82, the cumulative branch metric $E_m$ at the m-th stage is calculated from the cumulative metric $E_{m-1,n}$ and symbol candidate points at (m−1)-th stage. At step S83, the minimum value $E_{m,min}$ is determined in the calculated cumulative branch metrics. At step S84, the threshold $E_{m,min}+XN_0$ is calculated. It is assumed that the value of X is appropriately adjusted depending on a radio channel state. At step S85, surviving candidates are determined based on comparison of the metrics.

10. Variation 4

Considering all combinations ($S_{m-1} \times C_{m-1,n}$) of surviving candidates $S_{m-1}$ at the previous stage and surviving candidates at the next stage in narrowing down symbol candidates in accordance with QRM-MLD method leads to significant operation load. In the present variation 4, specific examples are described for decreasing or limiting the number of candidates to be considered in the narrowing.

Figure 9:
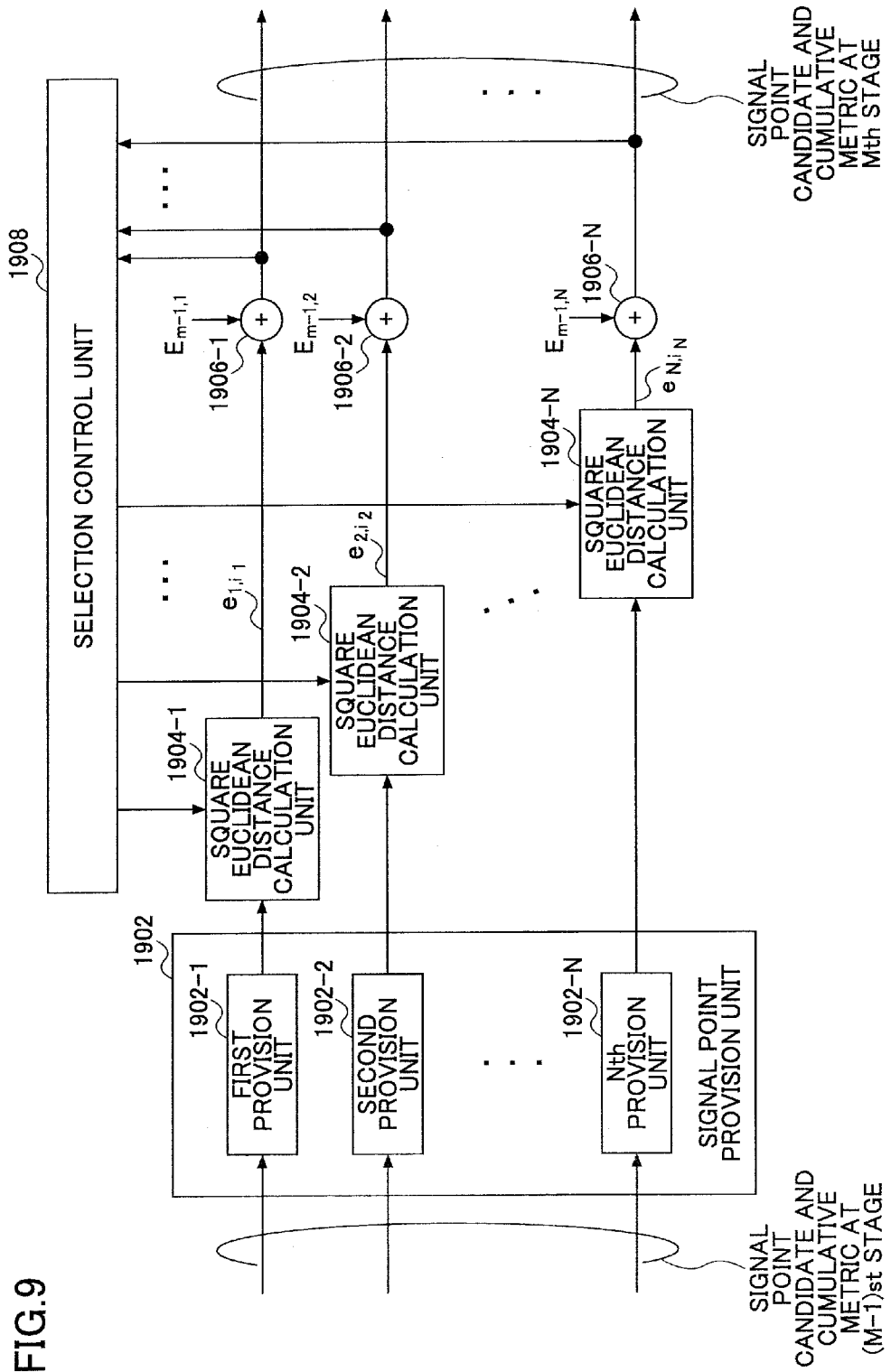
FIG. 9 is a functional block diagram illustrating a MLD unit for use in variation 4.
Figure 10:
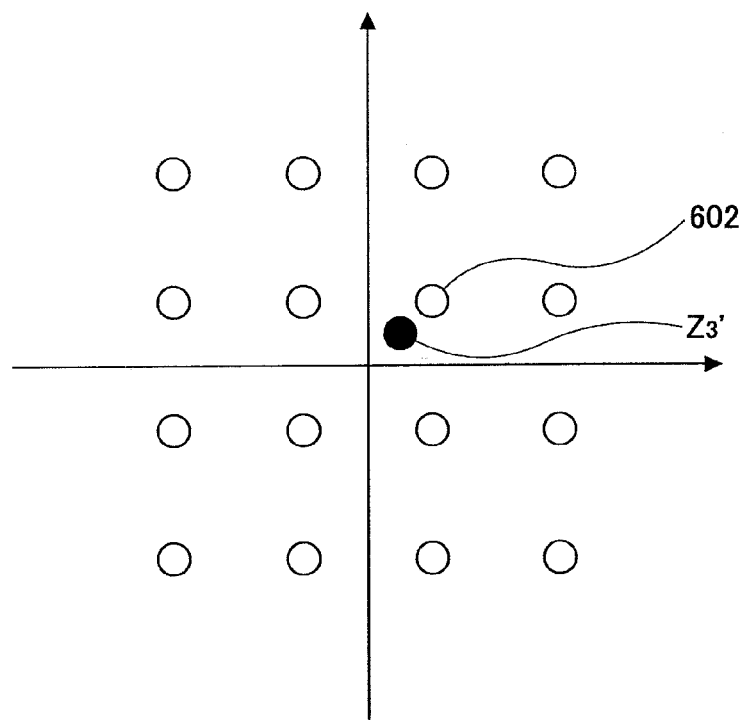
FIG. 10 illustrates an operation of variation 4.

FIG. 9 is a partial functional block diagram illustrating relevant parts in the MLD unit of the receiver with the present variation 4. This may correspond to one of the detection units 216 in FIG. 5. Alternatively, it may correspond to the MLD unit in FIG. 6. For convenience, it is assumed that elements in FIG. 9 serve to execute operations in one detection unit in FIG. 5. Details of the operation are described in conjunction with FIG. 10. In FIG. 9, a signal point provision unit 1902, multiple square Euclidean distance calculation units 1904-1 to 1904-N, multiple addition units 1906-1 to 1906-N and a selection control unit 1908 are illustrated. The signal point provision unit 1902 includes the first to N-th provision units 1901-1 to 1901-N.

The signal point provision unit 1902 receives information regarding signal point candidates obtained at the previous stage and generates signal point candidates for use in the current stage (step). The terms "stage" and "step" may be equivalently used. For convenience, it is assumed that N=16. Each of the first to N-th provision units 1901-1 to 1901-N has the same arrangement and function, the first provision unit 1901-1 is illustratively described. The first provision unit 1901 receives one signal point candidate obtained at the previous stage and generates 16 signal points as determination targets at the current stage. The 16 signal points represent signal points in the 16QAM and correspond to white points 602 in FIG. 10. The transmitter transmits any of the 16 signal points, which is received at the receiver. The signal point received at the receiver corresponds to black point in FIG. 10, for example.

Assuming M=4 in formula (4) in the above section "4. Operations", formula (4) can be represented as follows, $$z_1 = r_{11}x_1 + r_{12}x_2 + r_{13}x_3 + r_{14}x_4;$$

$$z_2 = r_{22}x_2 + r_{23}x_3 + r_{24}x_4;$$

$$z_3 = r_{33}x_3 + r_{34}x_4;\text{ and}$$

$$z_4 = r_{44}x_4.$$

Figure 11:
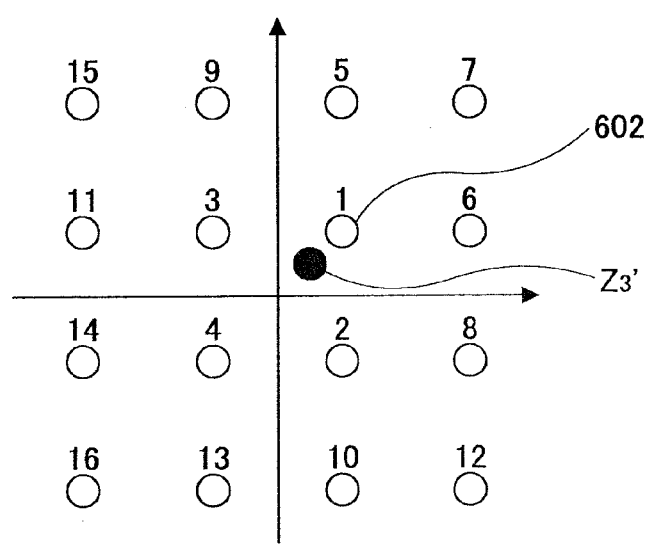
FIG. 11 illustrates signal point candidates ranked for reception signal points.

As stated above, $x_4$ is first estimated based on the fourth formula. Candidates of $x_4$ are determined based on known $r_{44}$ and reception signal $z_4$. Then, candidates of $x_3$ are determined based on the third formula. Since $x_3=(r_{33})^{-1}(z_3-r_{34}x_4)$, the candidates of $x_3$ are estimated based on the reception signal $z_3$, the known value $r_{34}$ and a predefined number of candidates $x_4$ as already estimated at the previous stage. Assuming that $z_3' = z_3 - r_{34}x_4$, this corresponds to the black point in FIG. 10. The first provision unit 1901-1 ranks 16 signal points provided at this stage based on the reception signal. FIG. 11 illustrates the ranked 16 signal points. The illustrated numbers correspond to rank order. The signal point 602 closest to $z_3'$ is the closest (most probable and the largest likelihood), and the ranking number "1" is assigned to it. The ranking numbers may be assigned under any determination criteria. As one example, the ranking number may be assigned based on the square Euclidean distance between the reception signal and the signal points. It is preferable to define which of the signal points having the same distance has higher priority beforehand. Alternatively, the same ranking number may be assigned to the equidistant signal points.

The square Euclidean distance calculation units 1904-1 to 1904-N in FIG. 9 calculate the square Euclidean distance $e_{x,ix}$ (x=1, ..., N) between signal pints supplied from the first to N-th provision units 1901-1 to 1901-N, respectively, under control by the selection control unit 1908.

For each signal point candidate, the addition units 1906-1 to 1906-N add the square Euclidean distances $E_{m-1,1}$ to $E_{m-1,N}$ calculated at the previous stage to the square Euclidean distances $e_{1,i1}$ to $e_{N,iN}$, respectively, calculated at the current stage and output the results as the cumulative values of the square Euclidean distances (cumulative metrics).

The selection control unit 1908 controls operations of individual elements and main operations on the present embodiment. In general, according to the present variation, 16 signal point candidates are obtained by repeating operations including extracting one signal point among ranked signal point candidates (256 candidates in total within the signal point provision unit 1902) in the probability order, calculating the square Euclidean distance, updating comparison amounts, extracting the next one signal point and calculating the square Euclidean distance. The square Euclidean distance has to be calculated only 16 times, which significantly reduces the operation load for signal separation.

Figure 12:
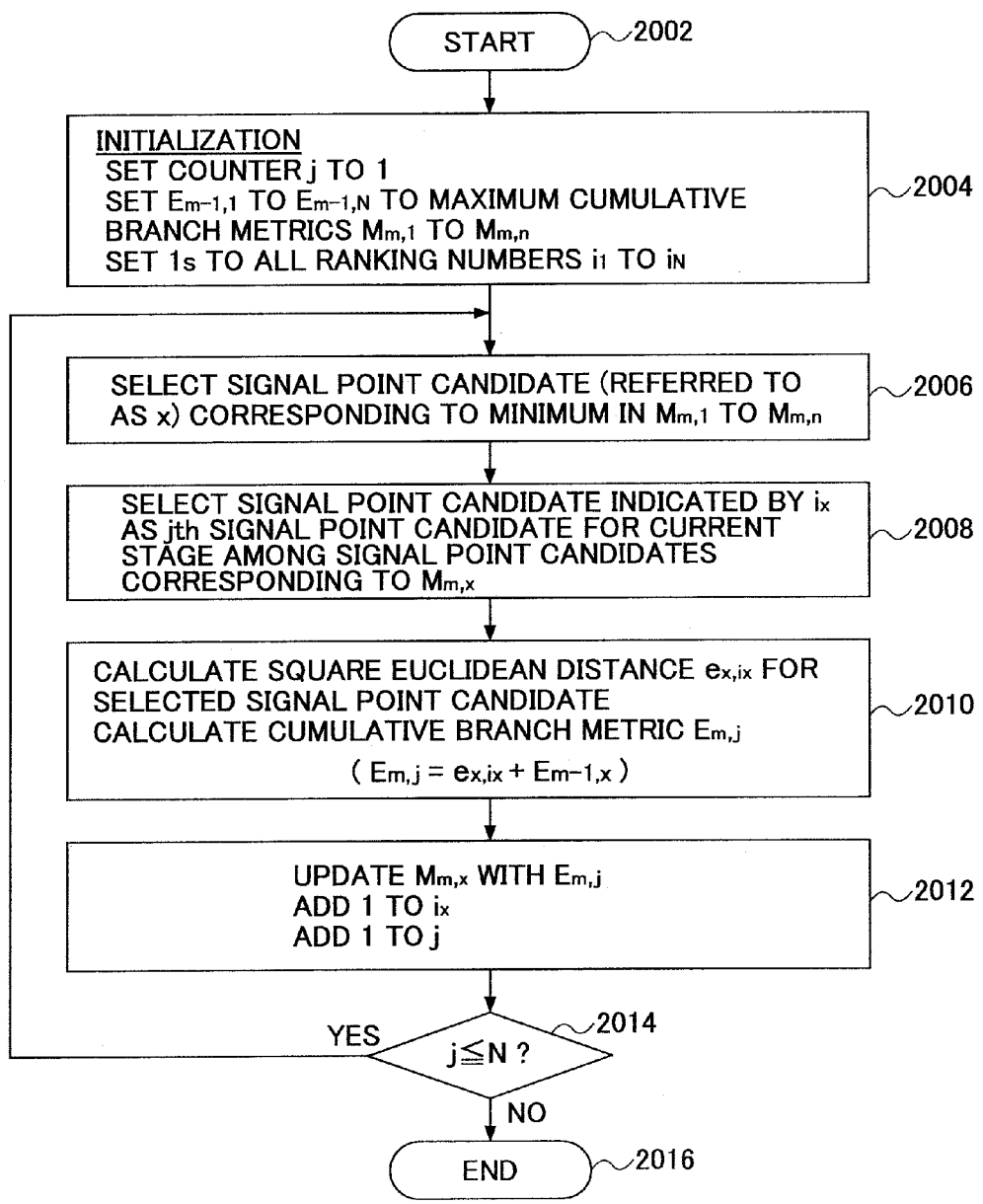
FIG. 12 is a flowchart illustrating an operation of variation 4.

FIG. 12 is a flowchart illustrating an operation according to the present variation. The flow starts with step 2002 and proceeds to step 2004. At step 2004, parameters for use in calculation are initialized. Parameter j is a counter for indicating one of all 16 signal point candidates supplied at the current stage and is set as j=1 (1≦j≦N=16). $E_{m-1,1}$ to $E_{m-1,N}$ are cumulative values or cumulative metrics of the square Euclidean distance calculated at the (m−1)-th stage (previous stage), and individual cumulative metrics such as $E_{m-1,1}$ are also referred to as cumulative branch metrics. The maximum cumulative branch metrics $M_{m,1}$ to $M_{m,N}$ are used as criteria of magnitude comparison as stated below and are set to the cumulative branch metrics $E_{m-1,1}$ to $E_{m-1,N}$, respectively, obtained at the previous stage ($M_{m,1}=E_{m-1,1}, \ldots, M_{m,N}=E_{m-1,N}$). In this example, N=16. The ranking numbers $i_1$ to $i_N$ indicate the order or likelihood for the 16 signal point candidates in the first provision unit 1901-1 and are set to one.

At step 2006, the magnitude of the 16 maximum branch metrics $M_{m,1}$ to $M_{m,16}$ are compared with each other, and the minimum ($M_{m,x}$) is selected. The x identifies the number of the selected signal point candidate in the signal point candidates at the previous stage. The signal point candidate associated with the maximum branch metric $M_{m,x}$ is obtained from the x-th provision unit 1901-x.

At step 2008, the signal point candidate identified with the ranking number $i_x$ is selected among the signal point candidates associated with the maximum branch metric $M_{m,x}$ as the j-th signal point candidate at the current stage.

At step 2010, the square Euclidean distance ($e_{x,ix}$) is calculated for the selected signal point candidate. The cumulative branch metric $E_{m,j}$ is also calculated in accordance with $E_{m,j}=e_{x,ix}+E_{m-1,x}$.

At step 2012, various parameters are updated. The maximum cumulative branch metric $M_{m,x}$ is updated with $E_{m,j}$. The ranking number $i_x$ is incremented by one. The counter j is also incremented.

At step 2014, it is determined whether the counter j is less than or equal to the maximum value N, and if the counter j is less than or equal to N, the flow returns to step 2006 where the same procedure is repeated, and otherwise, the flow proceeds to step 2016 and ends.

When the operation at one stage ends, the next stage is performed, and the same procedure is repeated to the last stage. In a signal separation operation, the cumulative metrics for the finally surviving 16 signal point candidates are compared to each other, and the signal point associated with the minimum cumulative metric (cumulative value of the square Euclidean distance) is determined as a reception signal point.

Figure 13:
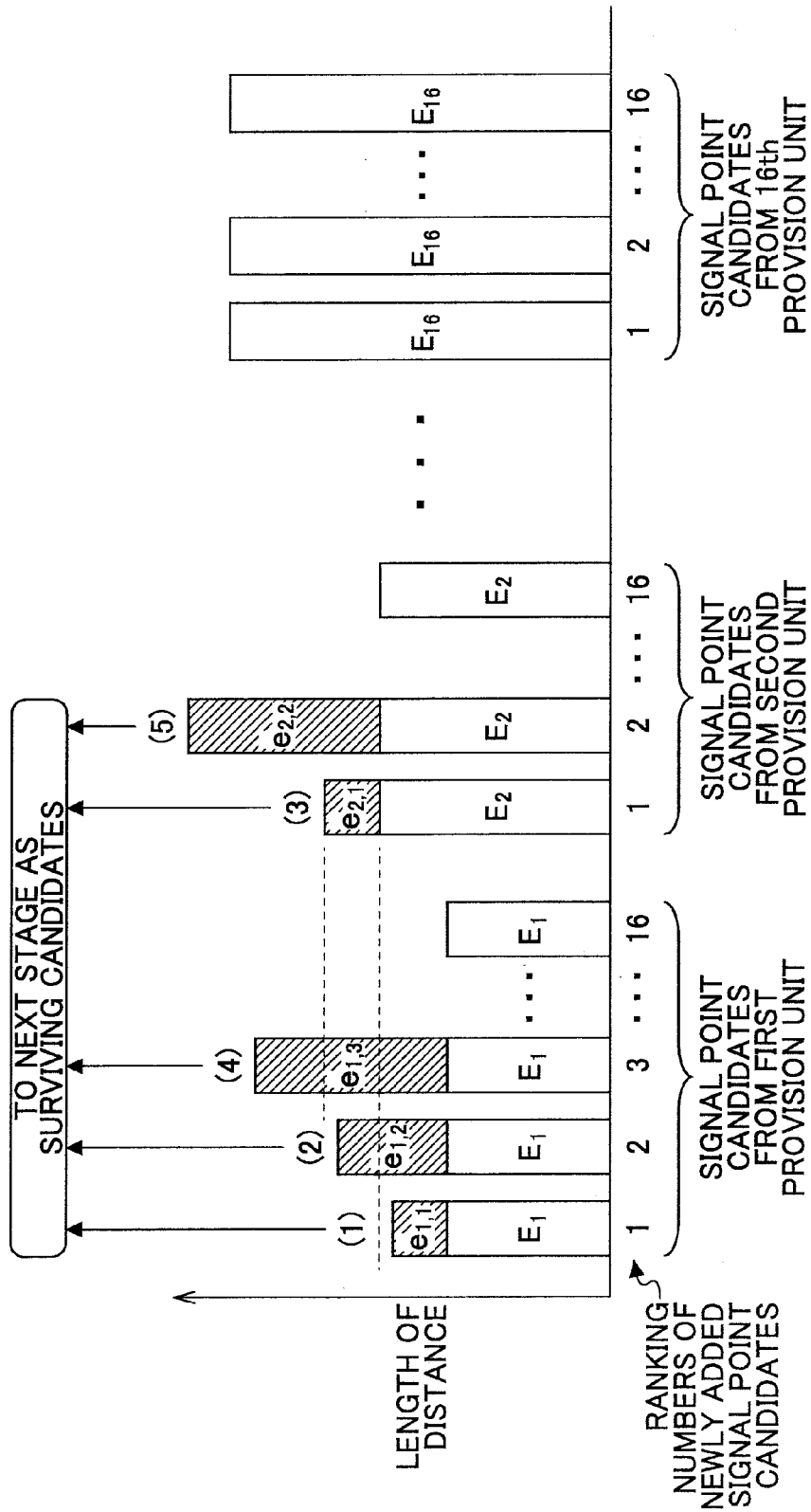
FIG. 13 illustrates an operation of variation 4.

FIG. 13 illustrates an exemplary operation for j=1 to 5 in the flow chart in FIG. 12. In other words, FIG. 13 schematically illustrates specific operations for selecting five signal point candidates among 256 (=16×16) signal point candidates from the signal point provision unit 1902.

Initially, it is assumed that x=1 for j=1. In this case, the signal point candidate identified with the ranking number $i_1=1$ (initial value) is selected among the signal point candidates supplied from the first provision unit 1901-1. The square Euclidean distance $e_{1,1}$ is calculated for the selected signal point candidate and added to the cumulative value $E_1$ derived at the previous stage (Although it is $E_{m-1,1}$, the suffix "m−1" is omitted for clarity). The maximum cumulative branch metric $M_{m,1}$ is updated from to $E_{m-1,1}$ to $e_{1,1}+E_{m-1,1}$. The ranking number $i_1$ is incremented by one ($i_1=2$).

For j=2, at step 2006, magnitude comparison is conducted for the updated $M_{m,1}$ and the others $M_{m,2}$ to $M_{m,16}$, and it is assumed that $M_{m,1}$ is the minimum again. Thus, x=1. In this case, the signal point candidate identified with the ranking number $i_1=2$ is selected among the signal point candidates supplied from the first provision unit 1901-1. The square Euclidean distance $e_{1,2}$ is calculated for the selected signal point candidate and added to the cumulative value $E_1$ derived at the previous stage. The maximum cumulative branch metric $M_{m,1}$ is updated from $e_{1,1}+E_{m-1,1}$ to $e_{1,2}+E_{m-1,1}$. The ranking number $i_1$ is incremented by one ($i_1=3$).

For j=3, at step 2006, magnitude comparison is conducted for the updated $M_{m,1}$ and the others $M_{m,2}$ to $M_{m,16}$, and it is assumed that $M_{m,2}$ is the minimum. Thus, x=2. In this case, the signal point candidate identified with the ranking number $i_2=1$ (initial value) is selected among the signal point candidates supplied from the second provision unit 1901-2. The square Euclidean distance $e_{2,1}$ is calculated for the selected signal point candidate and added to the cumulative value $E_2$ derived at the previous stage. The maximum cumulative branch metric $M_{m,2}$ is updated from $E_{m-1,2}$ to $e_{2,1}+E_{m-1,2}$. The ranking number $i_2$ is incremented by one ($i_2=2$).

For j=4, at step 2006, magnitude comparison is conducted for the updated $M_{m,1}$ and $M_{m,2}$ and the others $M_{m,3}$ to $M_{m,16}$, and it is assumed that $M_{m,1}$ is the minimum. Thus, x=1. In this case, the signal point candidate identified with the ranking number $i_1=3$ is selected among the signal point candidates supplied from the first provision unit 1901-1. The square Euclidean distance $e_{1,3}$ is calculated for the selected signal point candidate and added to the cumulative value $E_1$ derived at the previous stage. The maximum cumulative branch metric $M_{m,1}$ is updated from $e_{1,2}+E_{m-1,1}$ to $e_{1,2}+E_{m-1,1}$. The ranking number $i_1$ is incremented by one ($i_1=4$).

For j=5, at step 2006, magnitude comparison is conducted for the updated $M_{m,1}$ and $M_{m,2}$ and the others $M_{m,3}$ to $M_{m,16}$, and it is assumed that $M_{m,2}$ is the minimum. Thus, x=2. In this case, the signal point candidate identified with the ranking number $I_2=2$ is selected among the signal point candidates supplied from the second provision unit 1901-2. The square Euclidean distance $e_{2,2}$ is calculated for the selected signal point candidate and added to the cumulative value $E_2$ derived at the previous stage. The maximum cumulative branch metric $M_{m,2}$ is updated from $e_{2,1}+E_{m-1,2}$ to $e_{2,2}+E_{m-1,2}$. The ranking number $i_2$ is incremented by one ($i_2=3$).

In this manner, the five signal points and the cumulative branch metrics are calculated, and the candidates (1)-(5) survive. Actually, the same procedure is repeated until 16 signal point candidates are selected.

11. Variation 5

As stated above, when the symbol candidates are narrowed down in accordance with the QRM-MLD scheme, considering all combinations ($S_{m-1} \times C_{m-1,n}$) of the surviving candidates $S_{m-1}$ at the previous stage and possible candidates at the next stage increases operation load. Variation 5 described below decreases or limits the number of candidates in a manner different from variation 4.

For convenience, as in the above example, it is assumed that four symbols $x_1$, $x_2$, $x_3$ and $x_4$ are transmitted and received at a receiver. the 16QAM is assumed as the data modulation scheme in variation 4 while the BPSK scheme is assumed in variation 5 for clarity. In other words, each symbol $x_i$ (i=1, 2, 3, 4) corresponds to a signal point "−1" or "1". The relationship between transmission signals and reception signals is represented as follows, $$z_1 = r_{11}x_1 + r_{12}x_2 + r_{13}x_3 + r_{14}x_4;$$

$$z_2 = r_{22}x_2 + r_{23}x_3 + r_{24}x_4;$$

$$z_3 = r_{33}x_3 + r_{34}x_4; \text{ and}$$

$$z_4 = r_{44}x_4,$$

which correspond to formula (4) in the section "4. Operations" in the case of M=4.

Figure 14:
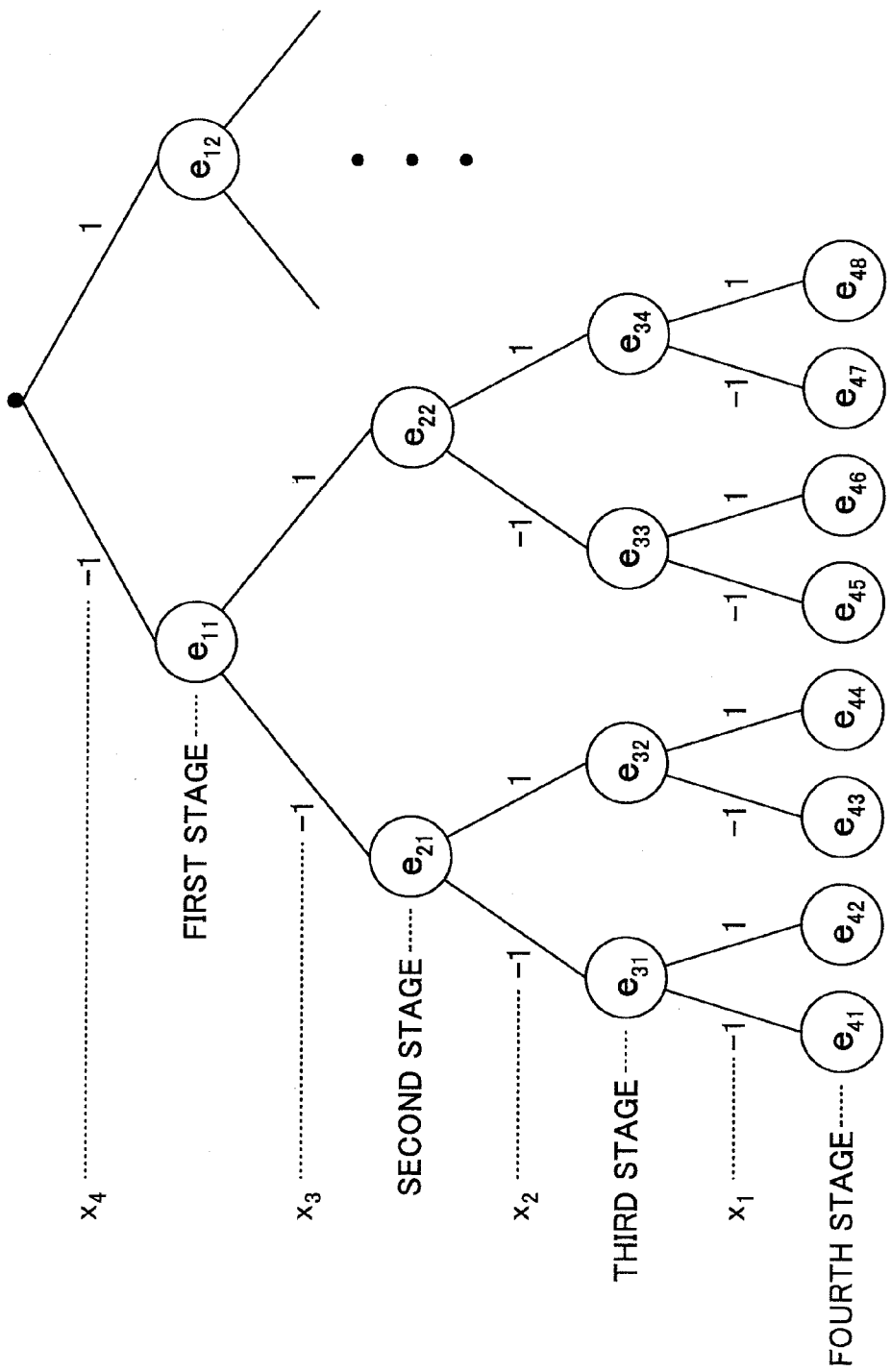
FIG. 14 illustrates an operation of variation 5.

The method according to variation 5 is described with reference to FIG. 14. Each symbol $x_i$ (i=1, 2, 3, 4) corresponds to "−1" or "1". In the illustration, the metric is represented as $e_{11}$ for $x_4$ of "−1", and the metric is represented as $e_{12}$ for $x_4$ of "1". As stated above, the metric is an amount calculated as the square Euclidean distance between a predefined signal point on a constellation and a reception signal point. In addition, the metric is represented as $e_{21}$ for $x_4$ of "−1" and $x_3$ of "−1". The metric is represented as $e_{22}$ for $x_4$ of "−1" and $x_3$ of "1". The $e_{21}$ and $e_{22}$ are cumulative metrics of the metric associated with $x_4$ and the metric associated with $x_3$. Similarly, the cumulative metrics are represented as $e_{31}, e_{32}, e_{33}, e_{34}, \ldots, e_{41}, e_{42}, \ldots$ for combinations of symbol candidates for $x_4, x_3, x_2$ and $x_1$. Note that all the cumulative metrics are not calculated. First, the cumulative metric is calculated for one combination of certain candidates for the four transmission symbols $x_4, x_3, x_2$ and $x_1$. For example, it is assumed that $x_4$="−1", $x_3$="−1", $x_2$="−1" and $x_1$="−1". Then, the cumulative metric $e_{41}$ is calculated. The cumulative metric $e_{42}$ is calculated for the case of $x_4$="−1", $x_3$="−1", $x_2$="−1" and $x_1$="−1" and is compared to the cumulative metric $e_{41}$. A smaller one of the cumulative metrics is probable (higher likelihood). Thus, the combination of symbol candidates leading to the minimum cumulative metric in the bottom line $e_{41}, e_{42}, \ldots$ would be the most probable. For this reason, it may be theoretically possible that all the cumulative metrics $e_{41}, e_{42}, \ldots$ in the bottom line are calculated, the minimum cumulative metric is found through the magnitude comparison for the calculated metrics and the optimal symbol candidate combination is identified. However, this has heavy operation load.

Meanwhile, the cumulative metric is calculated through the addition of the square Euclidean distance and accordingly must have increase property. For example, in FIG. 14, the metrics $e_{11}, e_{21}, e_{31}$ and $e_{41}$ at the first, second, third and fourth stages are larger in that order. It is assumed that as a result of comparison between the cumulative metric $e_{41}$ at the fourth stage and the cumulative metric $e_{22}$ at the second stage, the cumulative metric $e_{22}$ is larger than $e_{41}$. In this case, $e_{33}$ and $e_{34}$ calculated at the third stage corresponding to the cumulative metric $e_{22}$ would be larger than the cumulative metric $e_{22}$. Similarly, $e_{45}, e_{46}, e_{47}$ and $e_{48}$ are further larger. Accordingly, according to variation 5, if the cumulative metric $e_{22}$ is larger than $e_{41}$ as a result of comparison between the cumulative metric $e_{41}$ at the fourth stage and the cumulative metric $e_{22}$ at the second stage, symbol combinations subsequent to $e_{22}$ are not considered. In other words, the cumulative metrics $e_{33}, e_{34}, e_{45}, e_{46}, e_{47}$ and $e_{48}$ are not calculated. This is because these would be larger than the cumulative metric $e_{41}$. In this manner, in variation 5, the cumulative metric $e_{41}$ corresponding to the certain symbol candidate combination is calculated, and combinations having the cumulative metrics, such as $e_{22}$, larger than the calculated cumulative metric are excluded from the surviving candidates. This can decrease the number of calculations of the cumulative metrics. In addition, combinations having the cumulative metrics, such as $e_{22}$, larger than a predefined constant R may be excluded from the surviving candidates. By setting the R to a small value expected to be larger than the finally found minimum cumulative metric, it is possible to further reduce the number of calculations of the cumulative metrics.

The present invention has been described with reference to the specific embodiments, but the embodiments are simply illustrative, and those skilled in the art will understand various variations, modifications, alterations and substitutions. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2008-098633 filed on Apr. 4, 2008, the entire contents of which are hereby incorporated by reference.

This international patent application is based on Japanese Priority Application No. 2008-315034 filed on Dec. 10, 2008, the entire contents of which are hereby incorporated by reference.

The invention claimed is:

1. A receiver for use in a mobile communication system using a MC-CDMA scheme and a MIMO transmission scheme,
    wherein in the mobile communication system, a set of symbols in a sequence of transmission symbols together with spreading codes for code multiplexing is converted into a code-multiplexed signal, and inverse Fourier transform is performed on the converted code-multiplexed signal, and the resulting signal is transmitted from multiple transmit antennas,
    the receiver comprising:
    an antenna;
    an extraction unit configured to perform Fourier transform on signals received at multiple receive antennas and extract signal components of individual subcarriers; and
    a signal detection unit configured to apply a QR decomposition algorithm to the extracted signal components and estimate a transmission symbol,
    wherein the signal detection unit includes:
    a decomposition unit configured to find a unitary matrix such that a product of a spreading matrix and a channel matrix is equal to a product of the unitary matrix and a triangular matrix, the spreading matrix having the spreading codes for the code multiplexing as matrix elements, and the channel matrix representing radio channel states between the transmit antennas and the receive antennas; and
    an estimation unit configured to use the triangular matrix and a vector to estimate transmission symbols transmitted from the individual transmit antennas, the vector resulting from multiplication of the unitary matrix with a reception vector including the signal components received at the receive antennas.

2. The receiver as claimed in claim 1, wherein the estimation unit includes a candidate narrowing unit configured to provide metrics for the individual symbol candidates and narrow down the symbol candidates based on the metrics, the metrics representing square Euclidean distances between the symbol candidates and reception symbols on a symbol constellation.

3. The receiver as claimed in claim 2, further comprising:
    a rearrangement control unit configured to provide the decomposition unit with an indication signal for rearranging rows or columns of a matrix product of the channel matrix and the spreading matrix,
    wherein the decomposition unit finds the triangular matrix and the unitary matrix in accordance with the indication signal such that the matrix product having the rearranged row or columns is equal to a product of the triangular matrix and the unitary matrix.

4. The receiver as claimed in claim 3, wherein the rearrangement control unit provides the indication signal such that the estimation unit estimates a symbol from a transmit antenna corresponding to greater reception power before estimating a symbol from a transmit antenna corresponding to smaller reception power in accordance with a M algorithm.

5. The receiver as claimed in claim 3, wherein the rearrangement control unit provides the indication signal such that the estimation unit estimates a subcarrier component of a symbol transmitted from a second transmit antenna in a first subcarrier after estimating a subcarrier component of the first subcarrier of a symbol transmitted from the first transmit antenna.

6. The receiver as claimed in claim 2, wherein a number of surviving symbol candidates at each stage is variably controlled depending on a radio transmission state in narrowing down the symbol candidates by the estimation unit using a M algorithm where a number of stages corresponding to a number of rows or a number of columns of the triangular matrix are utilized.

7. The receiver as claimed in claim 2, wherein
the estimation unit narrows down the symbol candidates by using a M algorithm having a number of stages corresponding to a number of rows or a number of columns of the triangular matrix,
cumulative metrics are calculated for individual combinations of symbol candidates surviving until a certain stage and are stored as cumulative metrics for the certain stage, and
the estimation unit determines a combination of symbol candidates surviving at a next stage by comparing a sum of a metric of a symbol candidate added at the next stage and the cumulative metric of a certain combination of symbol candidates with a cumulative metric of another combination of symbol candidates.

8. The receiver as claimed in claim 2, wherein the estimation unit calculates a total sum of the metrics for a certain combination symbols transmitted from individual transmit antennas and excludes a combination of symbols having a total sum larger than the calculated total sum from the surviving candidates.

9. A mobile communication system including a transmitter and a receiver and using a MC-CDMA scheme and a MIMO transmission scheme,
the transmitter comprising:
an antenna;
a conversion unit configured to convert a set of symbols in a sequence of transmission symbols together with spreading codes for code multiplexing into a code-multiplexed signal;
an inverse Fourier transform unit configured to perform inverse Fourier transform on the code-multiplexed set of symbols; and
a transmitting unit configured to transmit signals including the inverse Fourier transform applied symbols from multiple transmit antennas,
the receiver comprising:
an extraction unit configured to perform Fourier transform on signals received at multiple receive antennas and extract signal components of individual subcarriers; and
a signal detection unit configured to apply a QR decomposition algorithm to the extracted signal components and estimate a transmission symbol,
wherein the signal detection unit includes:
a decomposition unit configured to find a unitary matrix such that a product of a spreading matrix and a channel matrix is equal to a product of the unitary matrix and a triangular matrix, the spreading matrix having the spreading codes for the code multiplexing as matrix elements, and the channel matrix representing radio channel states between the transmit antennas and the receive antennas; and
an estimation unit configured to use the triangular matrix and a vector to estimate transmission symbols transmitted from the individual transmit antennas, the vector resulting from multiplication of the unitary matrix with a reception vector including the signal components received at the receive antennas.

10. The mobile communication system as claimed in claim 9, wherein the transmitter is provided in a user equipment and the receiver is provided in a base station apparatus.

11. A method for use in a mobile communication system including a transmitter and a receiver and using a MC-CDMA scheme and a MIMO transmission scheme, comprising:
at the transmitter,
converting a set of symbols in a sequence of transmission symbols together with spreading codes for code multiplexing into a code-multiplexed signal;
performing inverse Fourier transform on the code-multiplexed set of symbols; and
transmitting signals including the inverse Fourier transform applied symbols from multiple transmit antennas,
at the receiver,
performing Fourier transform on signals received at multiple receive antennas and extracting signal components of individual subcarriers; and
applying a QR decomposition algorithm to the extracted signal components and estimating a transmission symbol,
wherein the applying and estimating includes:
finding a unitary matrix such that a product of a spreading matrix and a channel matrix is equal to a product of the unitary matrix and a triangular matrix, the spreading matrix having the spreading codes for the code multiplexing as matrix elements, and the channel matrix representing radio channel states between the transmit antennas and the receive antennas; and
using the triangular matrix and a vector to estimate transmission symbols transmitted from the individual transmit antennas, the vector resulting from multiplication of the unitary matrix with a reception vector including the signal components received at the receive antennas.

* * * * *